United States Patent [19]
Basu

[11] Patent Number: 5,452,454
[45] Date of Patent: Sep. 19, 1995

[54] GENERIC REMOTE BOOT FOR NETWORKED WORKSTATIONS BY CREATING LOCAL BOOTABLE CODE IMAGE

[75] Inventor: Tushar K. Basu, Milford, Mass.
[73] Assignee: Digital Equipment Corporation, Maynard, Mass.
[21] Appl. No.: 805,572
[22] Filed: Dec. 10, 1991
[51] Int. Cl.$^6$ .............................................. G06F 15/16
[52] U.S. Cl. .................................. 395/700; 364/975.1; 364/975.2; 364/976; 364/DIG. 2; 364/280; 364/280.2
[58] Field of Search ................ 395/700, 325, 600, 425

[56] References Cited

U.S. PATENT DOCUMENTS

| | | | |
|---|---|---|---|
| 3,634,830 | 1/1972 | Baskin | 395/325 |
| 4,138,718 | 2/1979 | Toke et al. | 364/136 |
| 4,145,739 | 3/1979 | Dunning et al. | 395/800 |
| 4,590,556 | 5/1986 | Berger et al. | 395/700 |
| 4,590,557 | 5/1986 | Lillie | 395/700 |
| 4,663,707 | 5/1987 | Dawson | 395/700 |
| 4,724,521 | 2/1988 | Carron et al. | 395/700 |
| 4,752,870 | 6/1988 | Matsumura | 395/200 |
| 4,853,875 | 8/1989 | Brown | 364/514 |
| 4,885,770 | 12/1989 | Croll | 379/269 |
| 4,943,911 | 7/1990 | Kopp et al. | 395/375 |
| 5,142,680 | 8/1992 | Ottman et al. | 395/700 |
| 5,146,568 | 9/1992 | Flaherty et al. | 395/325 |
| 5,280,627 | 1/1994 | Flaherty et al. | 395/700 |
| 5,325,529 | 6/1994 | Brown et al. | 395/700 |
| 5,367,688 | 11/1994 | Croll | 395/700 |

OTHER PUBLICATIONS

Wylie, "BootToob Starts Macs over Ethernet: Device Uses Special Initialization ROM". (Remote Booting Softweare for Macintosh Networks), MacWeek, V5, N4, p. 15, Jan. 1991.
Scott et al, "Boot Mechnanism for Discless HP-UX", Hewlett-Packard Journal, V39, N5, pp. 331, Oct. 1988.
Abrahams, "VAX/VMS Services for MS-Dos", Dig. Tech Jour; No. 9, Jun. 1989, pp. 44–50.
Hancock, "Getting Down DECNET Downline System Loading", The DEC Professional, Jul. 1984, pp. 66–73.
IBM Technical Disclosure Bulletin, vol. 26, No. 10B, Mar. 1984, p. 5609, New York, U.S.; P. E. Milling: "Remote IPL of Diskette-Driven Computers".
IBM Technical Disclosure Bulletin, vol. 13, No. 5, Oct. 1970, p. 1203, New York, US: B. B. Young et al.: "Remote Initial Program Lead and Library Maintenance for Satellite Computers".
"The MS-DOS Encyclopedia," 1988, pp. 61–82, Article 2, Microsoft Press, Redmond, Wash., US.
IBM Technical Disclosure Bulletin, vol. 27, No. 1B, Jun. 1984, pp. 481–482, New York, US; D. J. Bradley et al.: "Feature Extensions for IBM Personal Computer".

*Primary Examiner*—Thomas G. Black
*Assistant Examiner*—Paul Harrity
*Attorney, Agent, or Firm*—Hamilton, Brook, Smith & Reynolds

[57] ABSTRACT

A system and method for booting a client workstation from a remote data processing system over a network includes initializing the client workstation sufficiently to establish network communications with a remote disk on the remote data processing system, establishing a network communications link between the local and remote systems, issuing a request from the client workstation to the remote data processing system over the network communications link for a task image code module for providing a network interface between the client workstation and the remote disk on the remote data processing system, downloading the task image code module from the remote to the client workstation in response to the request for the task image code module, invoking the task image code module by the client workstation to establish a network interface between the client workstation and the remote disk, copying an image of the remote disk over the network to the client workstation to create a local disk image stored in the client workstation, disconnecting the client workstation from the network, booting the client workstation from the disk image stored in the client workstation, including loading an operating system module from the disk image into the client workstation, invoking the operating system module to control the client workstation, loading network environment modules from the disk image into the client workstation under control of the operating system module, and invoking the network environment modules to establish a network communication link between the client workstation and the remote data processing system.

69 Claims, 22 Drawing Sheets

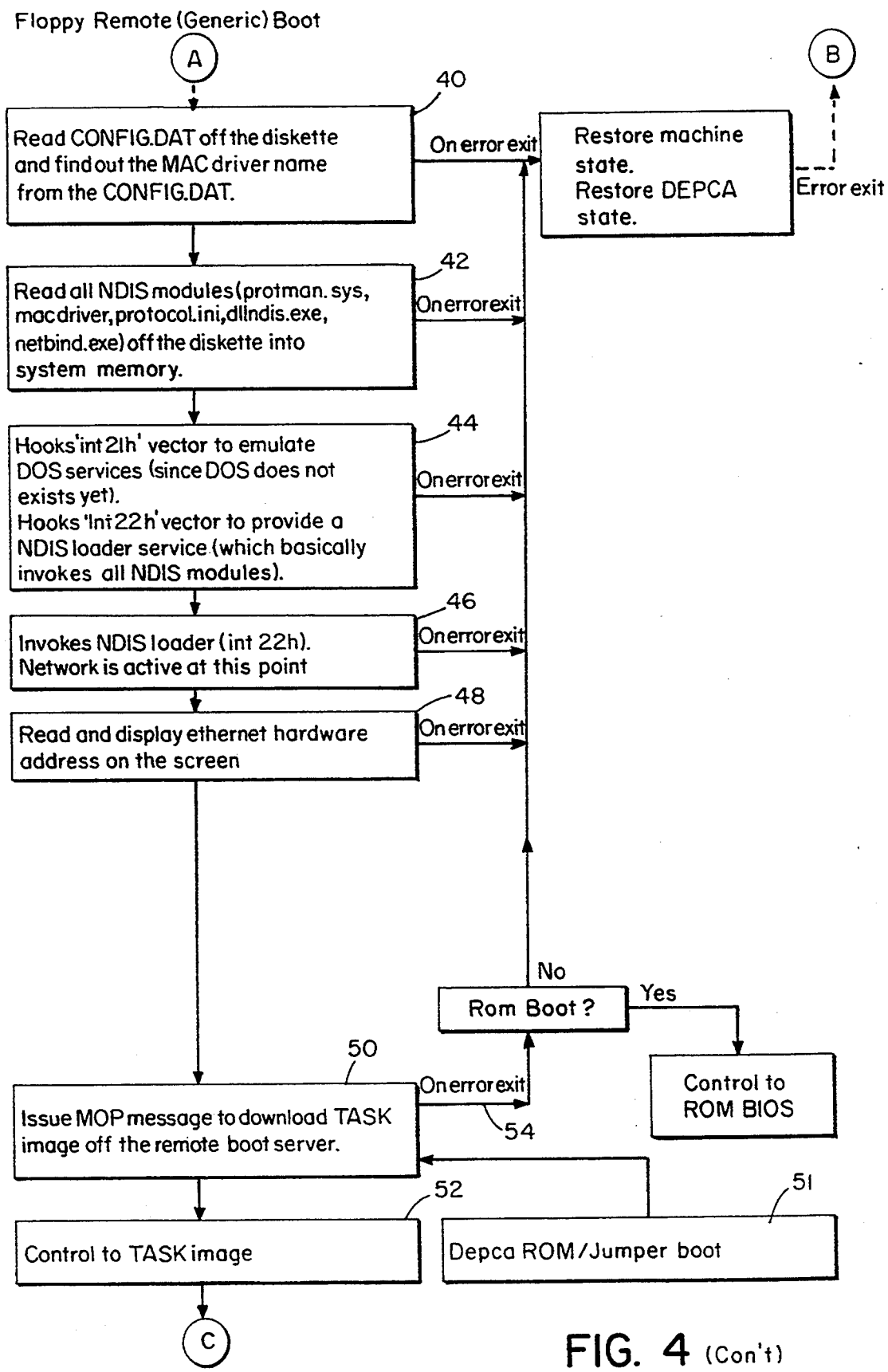
FIG. 4 (Con't)

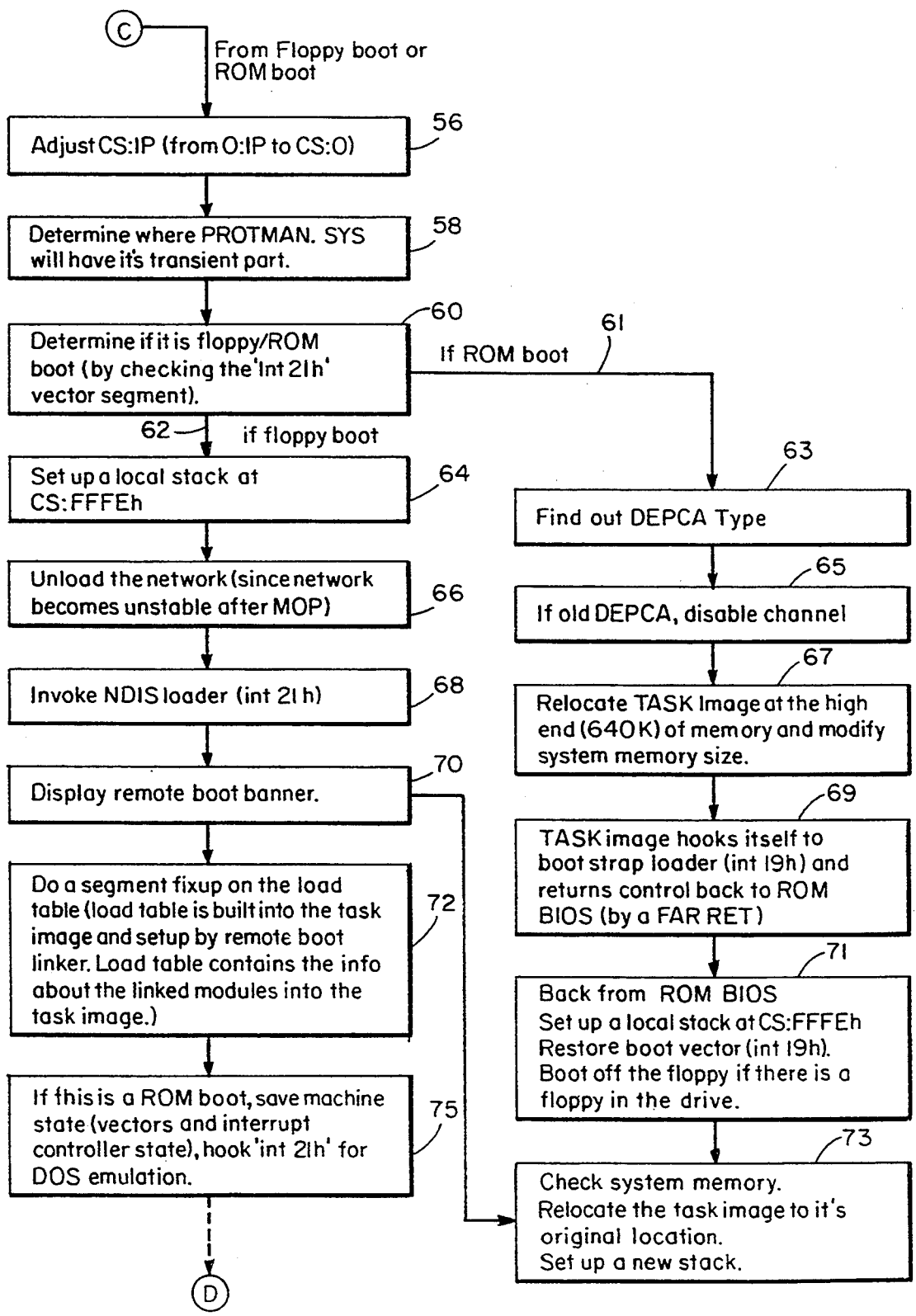
FIG. 4 (Con't)

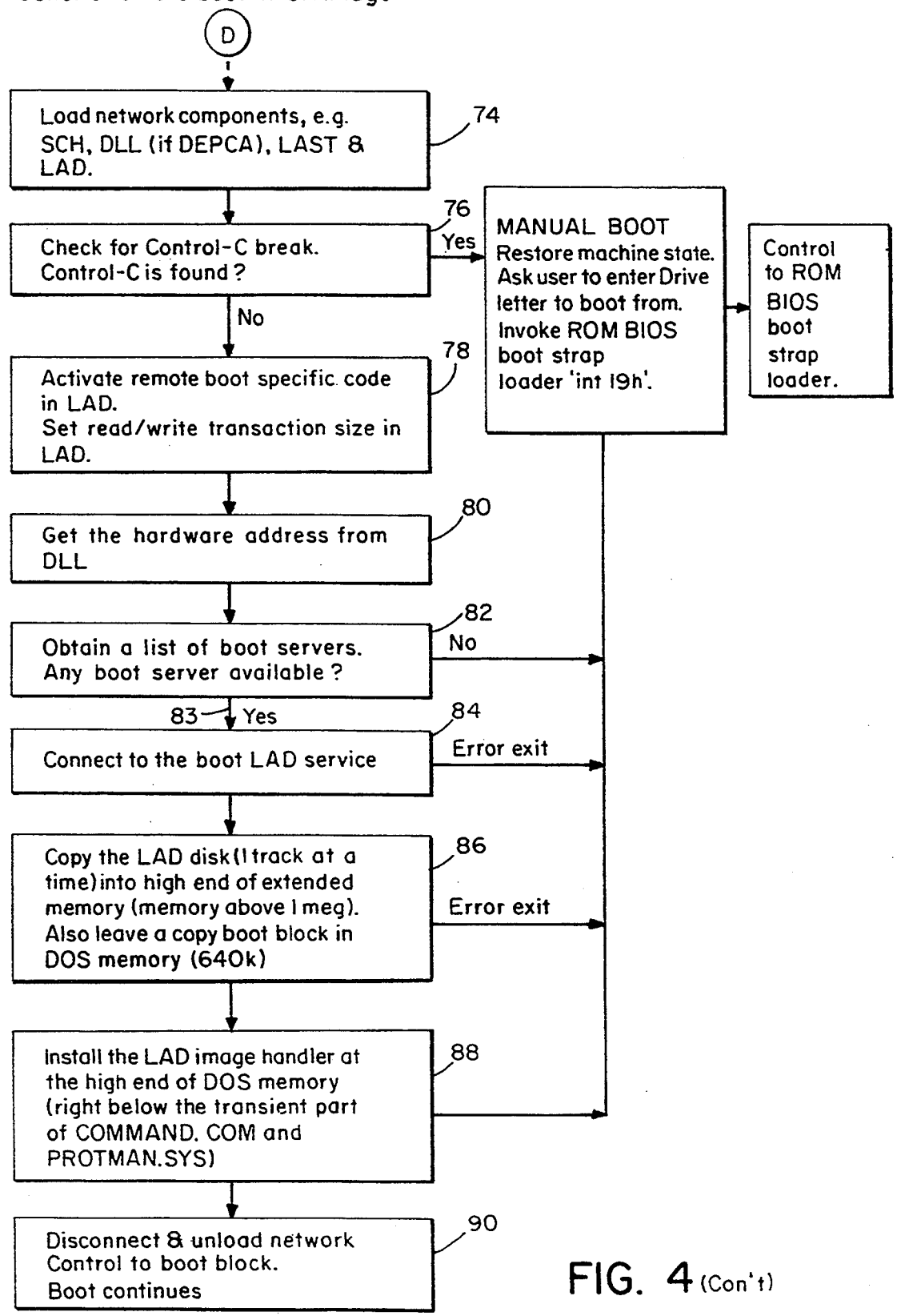
FIG. 4 (Con't)

CONFIG.SYS

```
files = 30
buffers = 30
last drive = Z
device=\ndis\protman.sys/i:a:\ndis\
device=\ndis\depca.dos
device=\decnet\himem.sys
device=\intel\EMM.SYS AT c800 200
device= \decnet\laddrv.sys
shell=a:\comman.com /p /e:1024
```

AUTOEXEC.BET

```
prompt=$p $g
\ndis\dlIndis.exe
\ndis\netbind
\decnet\sch
\decnet\emsload \decnet\last.exe /n:flyfox
\decnet\emsload \decnet\lad.exe
\decnet\use?: /x /env=drive
% drive %
set comspec = % drive %\command com
% drive %\decnet\start.bat
```

START.BAT

```
cd decnet
REM release the lad!!!
RESETLAD
REM---you can start the rest of PSCA here---
```

FIG. 15

GENERIC REMOTE BOOT FOR NETWORKED WORKSTATIONS BY CREATING LOCAL BOOTABLE CODE IMAGE

BACKGROUND OF THE INVENTION

Many computer workstations used in the office environment today are connected to other workstations, file servers, or other resources over a local area network (LAN). One popular type of workstation is the IBM-compatible Personal Computer (PC) system. One such LAN environment that supports these PCs as "clients" is the Personal Computing Systems Architecture (PCSA) which may be used in conjunction with a DECnet LAN, commercially available from Digital Equipment Corporation, Maynard, Mass., the assignee of the present invention.

Each client PC used in connection with a LAN typically contains one or more internal disk drives and requires its own disk operating system (DOS) to control the internal operation of the PC. For IBM-compatible PCs, the most common operating system is MS-DOS, commercially available from Microsoft Corp., Redmond, Wash.

Each client PC is connected to the LAN via an adapter circuit card which typically supports either a 3COM/Microsoft LAN Manager Network Driver Interface Specification (NDIS) type interface protocol or a Digital Equipment Corporation DEPCA type interface protocol.

A remote boot operation provides support for client PC systems in a LAN environment without requiring each client PC to have a local boot disk properly configured for the network. Remote boot operation allows centralized management of boot disks so that each client PC may be properly configured for operation on the network, i.e., each client PC is booted from a remote boot disk located elsewhere on the network. Additionally, the remote boot process provides support for completely diskless client PC operation. Furthermore, the remote boot process enhances software and network security since the remote boot files may be kept in a secure location and copies need not be distributed among the client PCs.

An approach to the PC Remote Boot process in the PCSA environment is described by Flaherty in U.S. patent application Ser. No. 07/240,955, now U.S. Pat. No. 5,146,568, assigned to the assignee of the present invention. The PCSA remote boot procedure uses virtual Local Area Disk (LAD) technology where the client PC is remote booted off a dedicated virtual disk which resides in a remote networked VAX/VMS server. This approach uses a specially designed remote boot "TASK IMAGE" which is first downloaded to the client PC from the remote VAX/VMS server and is activated by the client PC to establish its network environment, including logical connection to the remote LAD disk. Once the network environment is established, the client PC is booted from the LAD disk as though it were a local device. The network environment established by the TASK IMAGE remains in effect for the remainder of the network session.

This TASK IMAGE is a single segment binary file implementing a network derived from PCSA network components. Since the MS-DOS (or other disk operating system) is not yet in place when the TASK IMAGE is downloaded to the client PC, TASK IMAGE is built as a self-executing binary image, i.e., it does not contain standard MS-DOS executable components. The TASK IMAGE is loaded into the top portion of conventional memory, tightly packed against the uppermost available conventional memory address. Furthermore, the client PC system memory parameters are modified to reflect a smaller available conventional memory space which is adjusted by the size of the now resident TASK IMAGE which must remain active and protected in memory once MS-DOS is loaded and activated.

Once downloaded to the client PC, this TASK IMAGE is activated to establish the network environment under which the PC client will operate, i.e., the PC network environment depends on the networking components included in the TASK IMAGE. As such, this TASK IMAGE is specifically tailored for the type of network adapter used by the client PC. Once established, the network environment running under the TASK IMAGE code remains in effect for as long as the PC client is connected to the network.

SUMMARY OF THE INVENTION

The present invention provides a generic remote boot procedure for client PCs on a LAN which establishes the network environment under MS-DOS control. The generic remote boot procedure supports a wide variety of network adapters and networking environments, efficiently utilizes the client PC memory when loading the network environment, allows for either floppy disk or jumper (ROM) invoked remote booting, and uses standard and easily maintained software components.

In general, in one aspect, the invention features a data processing system and method for booting a local data processing system from a remote data processing system over a network. The method includes initializing the local system sufficiently to establish network communications with a remote data storage device on the remote system, copying an image of bootable code stored on the remote data storage device over the network to the local system to create a local image of the bootable code, and booting the local system from the local image of the bootable code. Preferably the remote data storage device is a remote disk and the locally stored bootable code is an image of the remote disk.

Preferred embodiments of the method include the local system establishing data communications over the network, issuing a request to the remote system for a task image module, also known as the GENERIC TASK IMAGE, for providing an interface between the local system and the remote disk, downloading the GENERIC TASK IMAGE from the remote system to the local system, and invoking the GENERIC TASK IMAGE on the local system to establish a network interface between the local system and the remote disk to allow copying an image of the remote disk to the local system to create the local disk image.

Yet other preferred embodiments of the method include disconnecting the local system from the network after copying the disk image of the remote disk to the local system, and booting the data processing system from the local disk image including loading an operating system module, e.g., MS-DOS modules, from the local disk image into the local system, invoking the operating system module to control the local system, loading network environment modules, e.g., NDIS modules, from the local disk image into the local system under the control of the operating system modules, and invoking the network environment modules to reestablish a local system network environment.

Preferred embodiments of the method also include initially booting the local system from a local floppy disk to load initialization modules into the local system to establish the data link to the remote system. Preferred embodiments of the initialization modules include an operating system emulation module for providing operating system functions for the local system, and networking environment modules for providing network communication functions for the local system. In preferred embodiments the operating system emulation module emulates MS-DOS functions and the networking environment modules provide an NDIS network environment. The NDIS modules include an NDIS protocol manager module for managing the NDIS environment, an NDIS MAC driver module for driving an NDIS network adapter, an NDIS data link layer module for implementing the data link of the NDIS environment, an NDIS configuration module including information for configuring the NDIS environment.

Another preferred embodiment of the method includes initially booting the local system from an initialization module stored in ROM to initialize the data link to the remote system. Preferred embodiments of the initialization module provide a DEPCA network environment for the local system.

Yet other preferred embodiments of the method include using Maintenance Operations Protocol (MOP) to issue the GENERIC TASK IMAGE download request and to download the GENERIC TASK IMAGE to the local system.

In still other preferred embodiments of the method, the GENERIC TASK IMAGE includes an operating system emulation module for providing operating system functions for the local system, a scheduler module for providing real-time scheduling of network resources for the local system, a data link layer module for providing a network data link for the network adapter of the local system, a disk access module for providing disk access services to the local system for accessing the remote disk, and a disk image access module for providing disk access services to the local system for accessing the local disk image. The disk access module is used to access the remote disk while copying the disk image to the local system, and then the disk image access module is loaded into memory and used to access the local disk image during booting of the local system from the local disk image.

Still other preferred embodiments of the method the local data processing system is a Personal Computer having a directly addressed conventional memory and an indirectly addressed extended memory (XMS), and the disk image is copied to the extended memory.

The present invention has particular application to systems in which a boot operation is initiated using a small amount of code read from ROM (ROM-BIOS) on power-up and then completed using bootable code read from disk storage. Typically, the disk storage is local, but in a remote booting system to which this invention is directed the disk storage used to boot the system is remote and is accessed over a network data link. Since the disk storage is remote, at least a portion of the network data link must be established by the initial code read from ROM or from code read from ROM and bootable code read from local disk storage. In prior systems, the initial network link was sufficient to retrieve a task image from remote storage which then implemented a full and permanent network link to the remote disk so that the boot operation could be completed over the network by booting the local system directly off the remote disk. In the present invention, the task image need only provide a temporary network link sufficient to copy the bootable code from the remote disk as a disk image in local storage. Thereafter, the local system is locally booted directly from the stored disk image without the need for an active network data link.

The network environment for a workstation, which allows the workstation to connect to remote servers, is typically established when the workstation is configured during the boot operation. In the prior systems a full network link had to be established by the task image before the local system could be remote booted across the network by the remote disk, and the remote boot operation was completed through that link. Thus, it was not possible to establish a different operational network data link during the remote boot operation. To do so would have required breaking the established network link which was required to complete the boot operation.

Further, in prior systems the locally stored code used to retrieve the task image, or the task image itself, did not contain operating system functions or memory management capability to load and execute standard software modules or load the task image code for the full network link into the expanded memory portion (EMS) of memory of the Intel 80×86 processor family. Since the task image had to be maintained throughout, as well as survive beyond, the remote boot operation to maintain the active network link the task image was loaded into a portion of conventional memory which was then protected by being made unavailable to the operating system established during the boot operation. As a result, the portion of memory in which the task image was stored was thereafter lost to the operating system. In the present invention, the task image contains sufficient operating system functionality so that it may load and execute standard software modules. Further, the task image of the present invention couples standard generic software modules, downloaded as part of the task image, with locally stored standard software modules specific to the local network adapter to implement the temporary network data link for copying the disk image.

In accordance with the present invention, no attempt is made to directly boot the local system from the remote disk through the network data link established by the task image. Rather, the task image of this invention includes sufficient operating system functions and memory management capabilities to store at least a significant portion of the bootable code from the remote disk into local memory, preferably into the extended memory portion (XMS) of the system. The boot operation may then be performed using the locally stored bootable code. With the bootable code stored locally, the network link is no longer required during the remote boot operation. Since the task image of this invention is thus no longer required, it is not necessary that it be protected after the boot operation so the full conventional memory space remains available for use by the operating system. Finally, since there is no longer a requirement that the network link established for copying the bootable code during the remote boot operation remain active through the completion of the remote boot operation, the type of network link may be changed. The type of network environment ultimately used by the system after the boot operation terminates is loaded during the boot operation under the control of the operating system which is loaded first. Also, since the network environment is loaded under the control of the operating system, it may be loaded into the expanded memory portion of the system to further conserve conventional memory space.

Thus, the invention described herein offers the advantages of establishing virtually any type of network environment for a remotely booted client workstation by loading the network environment under operating system control. Since the network environment is loaded under operating system control, the networking software modules may be loaded into the expanded memory (EMS) of the client PC, thereby advantageously freeing conventional memory for other uses, e.g., application programs. Still further, the invention has the advantage of using a GENERIC TASK IMAGE for controlling the boot process which is generated from standard, unmodified, software components and therefore is easy to make and maintain. Furthermore, since the GENERIC TASK IMAGE establishes a temporary network environment used only during the boot process, the GENERIC TASK IMAGE need not be modified every time one of its software components changes to perform effectively.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being place upon illustrating the principles of the invention.

FIG. 15 shows examples of the CONFIG.SYS, AUTOEXEC.BAT, and START.BAT files used with the generic remote boot procedure of this invention.

DESCRIPTION OF THE PREFERRED EMBODIMENT

Figure 1A:
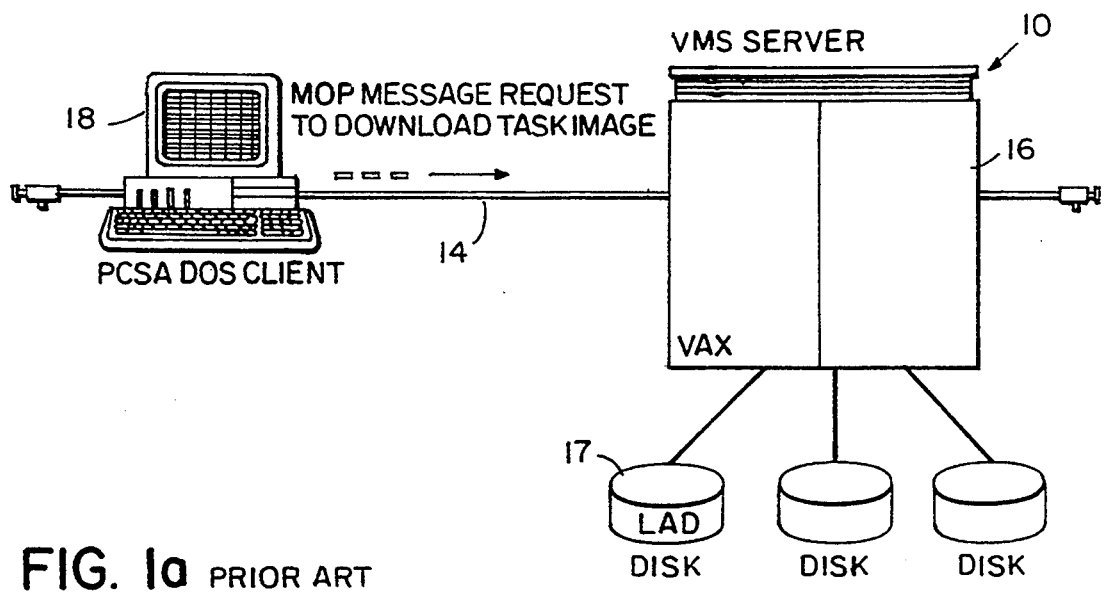
FIGS. 1a, 1b, 1c, 1d, 1e, and 1f are schematic diagrams showing the client PC networked with the VAX/VMS server and performing the generic remote boot procedure of this invention in which a message request, a task image, packets to access service LAD disk, packets to copy service LAD disk, termination of the network, and re-establishment of the network environment, respectively, are shown.

Referring to FIGS. 1a–1f, a computer network 10, having a digital communications link 14 for connecting one or more host computers 16 with one or more client workstations 18 and other devices, features a data processing system and a generic remote boot procedure for booting the client workstations off a remote disk which resides on the host computer 16. The preferred embodiment described herein is implemented on a DECnet computer network which is commercially available from Digital Equipment Corporation, Maynard, Mass., the assignee of this invention. Specifically, DECnet 10 features an EtherNet data link 14 providing communications between VAX host computers 16 running VMS operating system software and IBM-compatible personal computer (PC) clients 18 running MS-DOS operating system software and accessing the network using Digital Equipment Corporation Personal Computing Systems Architecture (PCSA) protocol. The VAX host computer operates as a PCSA server for the networked PC clients.

The generic remote boot technology of this invention allows networked PCSA PC clients, which may be configured with a floppy drive, a hard disk drive, or as a diskless PC, to be booted off a remote disk which resides on the VAX PCSA server 16. The remote disk may be configured on the VAX server as a virtual disk 17 known as a service Local Area Disk (LAD). One service LAD disk 17 is dedicated on the VAX server for each remote boot client.

Figure 1B:
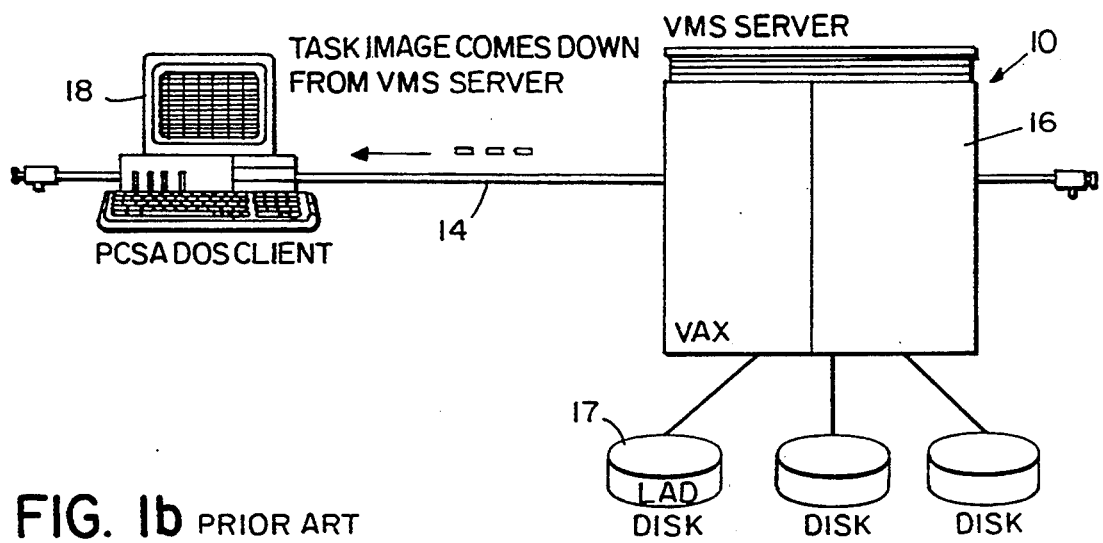
Figure 1C:
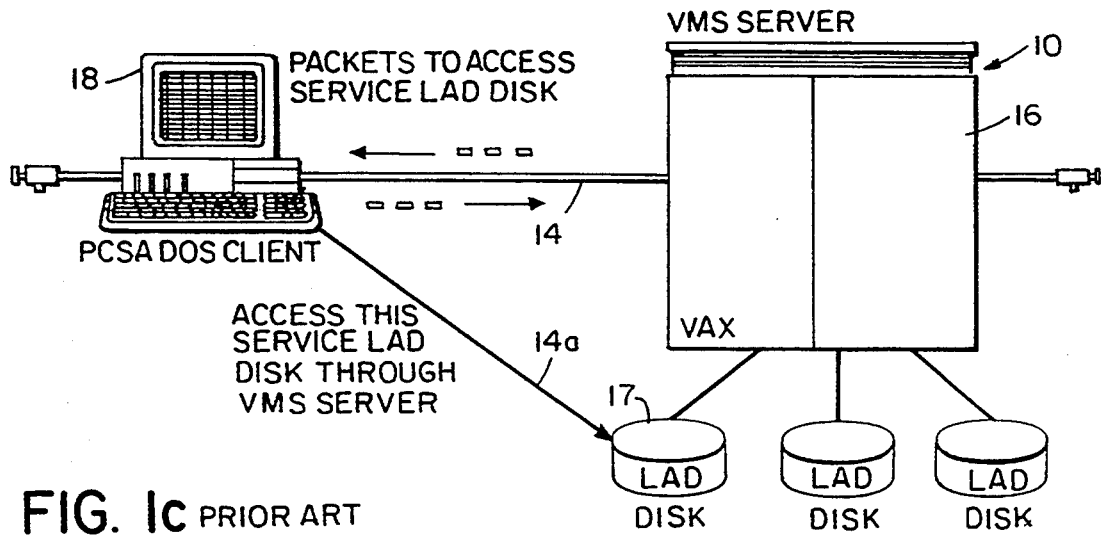
Figure 1D:
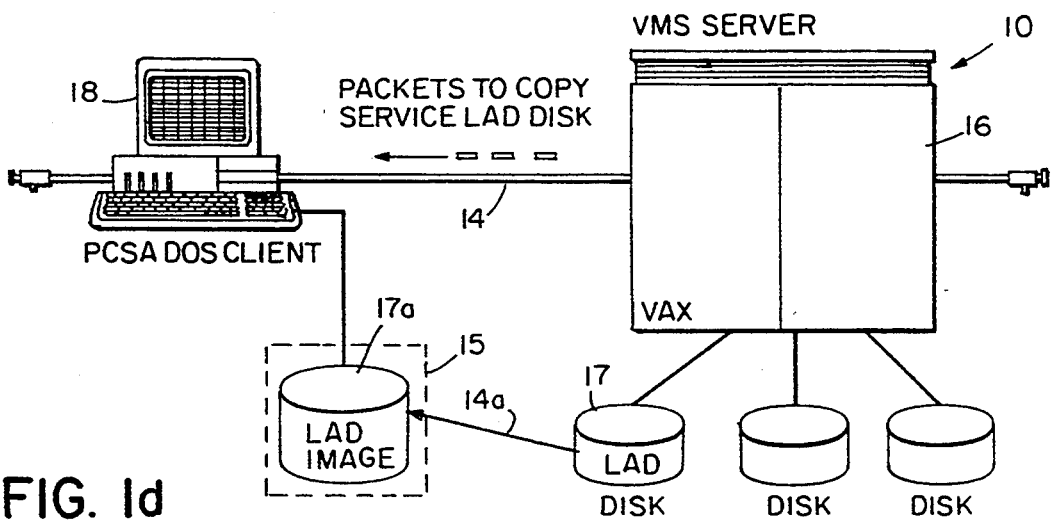
Figure 1E:
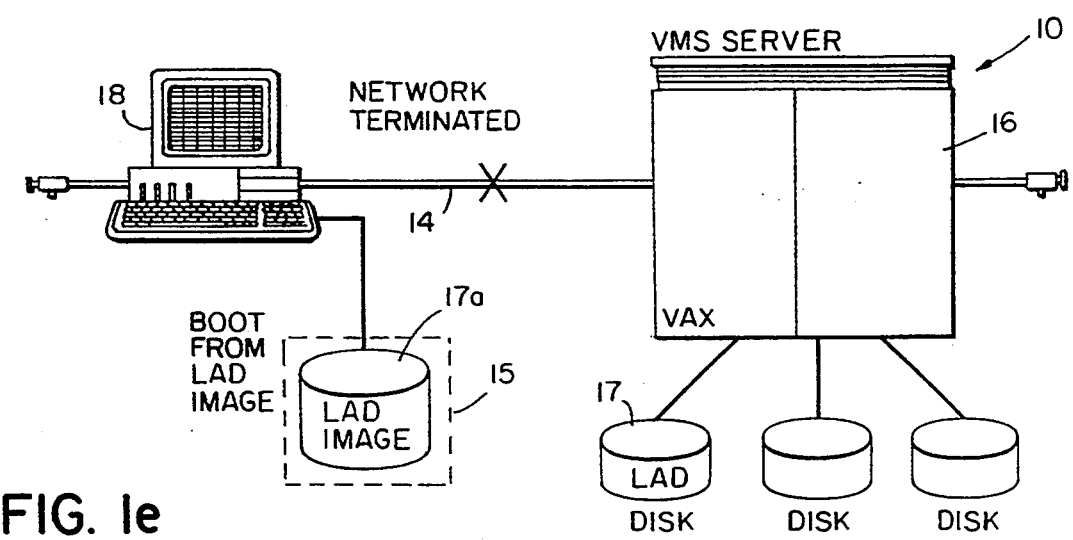
Figure 1F:
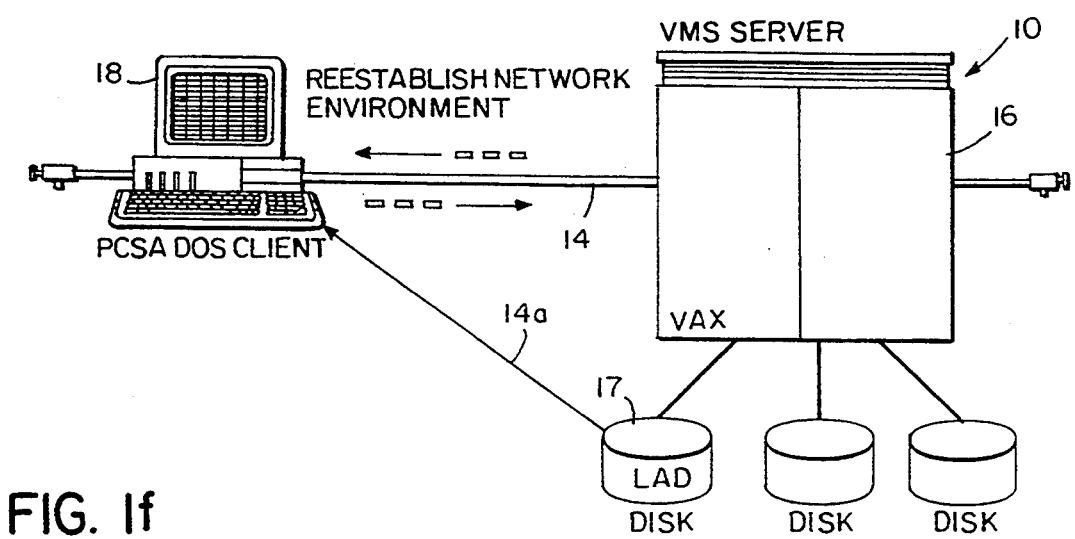

As shown in FIGS. 1a–1f, the remote boot procedure includes several steps generally similar to those found in prior art remote boot systems (FIGS. 1a–1c), and several important steps unlike those found in prior art systems (FIGS. 1d–1f). In general, shortly after power-up the client PC 18 to be remote booted establishes an initial network communications link with the VAX server 16 sufficient to issue a request to the server to download a task image (FIG. 1a). The server responds by sending the requested task image across the network to the client PC (FIG. 1b). The client PC invokes the task image to establish a logical network link 14a between the client PC and the LAD disk 17 on the server (FIG. 1c). At this point, the prior art system has established its full network environment and the client PC is directly booted from the remote service LAD disk across the logical network link 14a.

Unlike the prior art system, the client PC of the present invention is not directly booted from the remote service LAD disk. Rather, the client PC of the present invention uses the logical network link 14a to copy an image 17a of the remote service LAD disk to local storage 15 (FIG. 1d). Once the LAD disk image 17a is created in local storage 15, the network links are terminated and the client PC is directly booted from the locally stored LAD disk image 17a (FIG. 1e). During the boot from the local LAD disk image the client PC first loads the operating system and then loads a new networking environment under operating system control to reestablish the network (FIG. 1f).

For reasons that will become apparent, the client PC system should have an Intel 80286, 80386, 80486, or higher family CPU which can support at least 2 megabytes (MB) of extended memory (XMS), and have at least 600 kilobytes (KB) of conventional memory. An Ethernet controller and its corresponding NDIS Media Access Control (MAC) driver or a DEPCA network adapter are required to interface the PC client to the network. Other types of network adapters may also be supported. A DEPCA ROM is required on the DEPCA network adapter to support the jumper remote boot procedure described herein. The maximum size of the service LAD disk 17 should be limited to 1.2 MB but, for reasons that will become apparent, ultimately depends on the amount of XMS memory available.

Figure 2:
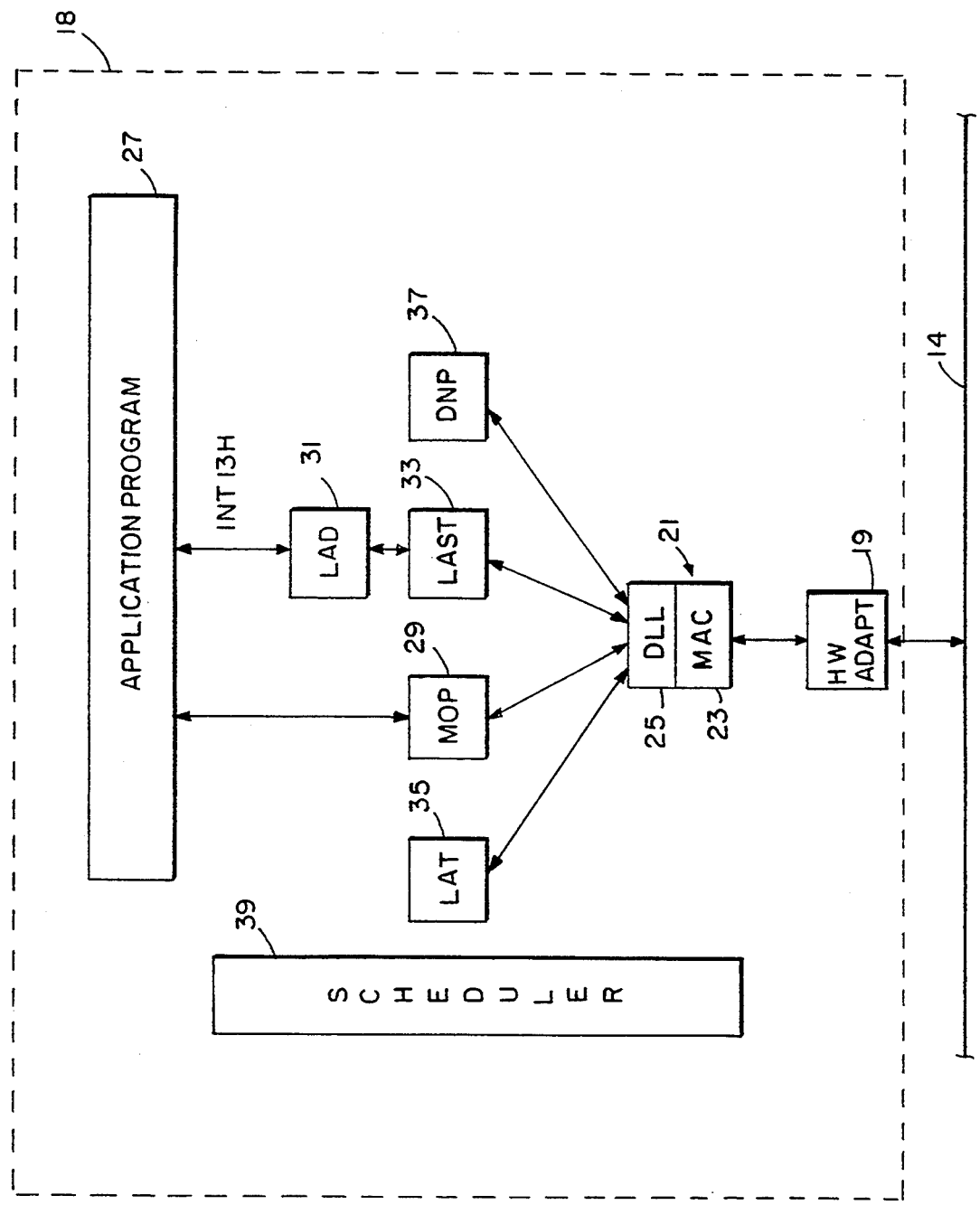
FIG. 2 is a schematic diagram showing the typical software environment of a networked client PC.

Referring to FIG. 2, there is shown a typical software environment for a networked client PC 18. Client PC 18 is physically connected to the EtherNet data link 14 via a hardware network adapter 19. Network adapter 19 is driven by a software data link module 21 which includes a MAC driver portion 23 implementing an interface specific for the type of network adapter 19 used, and a data link layer (DLL) portion 25 implementing a particular interface protocol to other elements of the software environment, e.g., the NDIS protocol.

An application program 27 running on the client PC may be interfaced to the network data link module 21, and thus the network, through a variety of protocols implemented by protocol specific software service routines. For instance, the application program may access network resources using the Digital Equipment Corporation Maintenance Operations Protocol (MOP) through a MOP service routine 29. Alternatively, the application program may directly access the service LAD disk on the remote VAX server through a software interrupt call to INT 13H which is serviced by a LAD Direct Access Disk handler 31 which interfaces to a Local Area Systems Transport (LAST) protocol driver 33 to interface to the data link module 21. Other service routines, such as LAT 35 and DNP 37 may also be available for use by the application program to interface with the network. A scheduler routine 39 coordinates the application program accesses to the software, hardware and network resources. Furthermore, multiple adapters interfaced to different network data links may be multiplexed through data link module 21 or other data link modules may be concurrently loaded into memory to allow access to other resources.

To begin the remote boot operation the client PC first initializes itself sufficiently to communicate on the network with the VAX server. This initialization may be provided by initially booting the client PC from a local floppy disk containing initialization software modules required to start a generic "floppy remote boot procedure". In the case of the DEPCA adapter, initialization may alternately be provided by booting the client PC from a local initialization ROM (DEPCA ROM) typically located on the (DEPCA) network adapter, to start a generic "jumper remote boot procedure". The presence of the DEPCA ROM in the client PC is indicated to the PC by a switch or jumper setting on the DEPCA network adapter.

Network communications at this point is established using the MOP protocol. The client PC sends a MOP download request message to the VAX server to request the GENERIC TASK IMAGE file which will provide the PC with means to establish a temporary network connection to the dedicated service LAD disk 17. The VAX server responds to the request by using MOP to download the GENERIC TASK IMAGE file from the VAX server 16 to the conventional memory of the PC client.

The GENERIC TASK IMAGE file provides means for the PC client to access the service LAD disk 17 using the Local Area System Transport (LAST) protocol, commercially available from Digital Equipment Corporation. Once the PC client-to-service LAD disk connection is established using the LAST protocol, the client PC copies the contents of the service LAD disk into its own extended memory system (XMS), i.e., it creates a LAD disk image (or LAD RAMDISK) in XMS.

GENERIC TASK IMAGE then invokes a special disk I/O interrupt handler which services software interrupt vector INT 13H by intercepting and directing all disk I/O calls to the LAD disk image. Subsequently, the client PC removes itself from the already running network, jumps to the boot sector of the LAD disk image, and reboots itself from the LAD disk image. Thus, the PC client performs a fresh boot of the PC system off the LAD disk image in XMS as though it were a local bootable disk device and without the need for a running network environment. Therefore, the client PC can first load MS-DOS (or another operating system) off the LAD disk image, and then load any desired network environment under MS-DOS control, e.g., an NDIS environment loaded into HIMEM. Once the network environment is loaded into the client PC, the network is reactivated.

Figure 3:
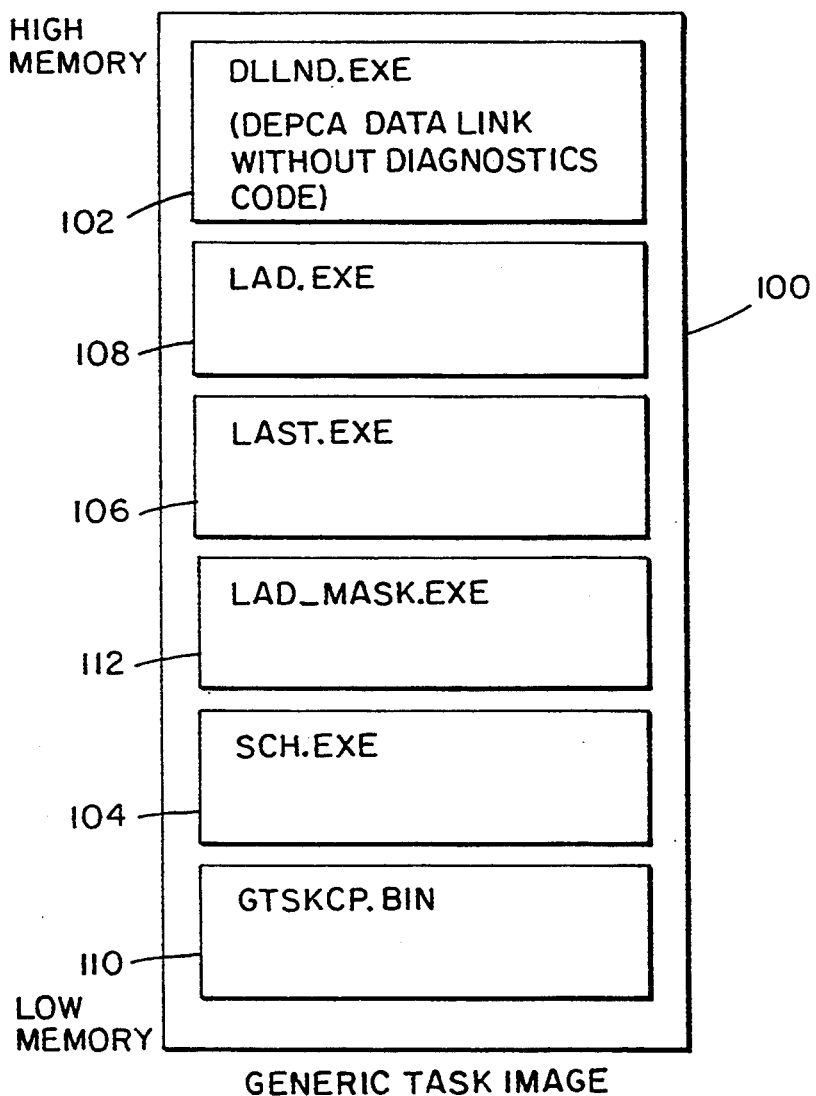
FIG. 3 is a memory map diagram showing the components of the GENERIC TASK IMAGE used with the generic remote boot procedure of this invention.

FIG. 3 shows a memory map 100 of the GENERIC TASK IMAGE described above. The GENERIC TASK IMAGE 100 is a binary file originally residing in the VAX server and is downloaded to the client PC in response to a MOP request for the GENERIC TASK IMAGE. In addition to downloading the GENERIC TASK IMAGE to the PC client, the VAX server informs the client PC where to load the GENERIC TASK IMAGE in the client PC conventional memory.

The VAX server builds the GENERIC TASK IMAGE by linking together otherwise unmodified MS-DOS executable (.EXE) PCSA network software components to a binary generic task control program module GTSKCP.BIN 110. These standard PCSA components include a data link layer component (21, FIG. 2) DLL.EXE 102 (used for the DEPCA adapter only), a network resource scheduler component (39, FIG. 2) SCH.EXE 104, and service LAD disk accessing components (33 and 31, FIG. 2) LAST.EXE 106 and LAD-.EXE 108. A specially designed LAD disk image component LAD_MASK.EXE 112 for accessing the LAD disk image in XMS is also appended to the GTSKCP.BIN module.

The GTSKCP.BIN module 110 is the generic task control program of the GENERIC TASK IMAGE 100 and emulates certain features of an MS-DOS operating system. When the GENERIC TASK IMAGE gets control of the client PC during the boot process, MS-DOS is not yet in place to execute the MS-DOS executable (.EXE) software components contained in the GENERIC TASK IMAGE. GTSKCP.BIN emulates enough of the MS-DOS operating system functions to provide an MS-DOS-like environment in which the GENERIC TASK IMAGE .EXE components may be executed.

The DLLND.EXE PCSA component 102 provides a data link for DEPCA network adapters. The GENERIC TASK IMAGE activates this data link only when the DEPCA adapter is configured to do a jumper remote boot procedure, i.e., initially boot the client PC from the DEPCA ROM located on the DEPCA adapter. For a floppy remote boot procedure using either a DEPCA adapter or a non-DEPCA adapter, e.g., an NDIS adapter, the initialization modules loaded from the floppy to the client PC include a data link MAC layer module (21, FIG. 2) specific to the PC client adapter type. Thus, for an NDIS adapter, an NDIS data link layer module is activated during the initialization portion of the floppy remote boot procedure, and the GENERIC TASK IMAGE ignores the DLLND.EXE file and allows the activated adapter NDIS data link to remain active. Therefore, the same GENERIC TASK IMAGE can be used to remote boot a client PC with virtually any type of network adapter as long as adapter specific data link modules are provided in the initialization modules loaded from the floppy disk.

The SCH.EXE PCSA component 104 performs as a real time resource scheduler which is required for the client PC to access all other DECnet/PCSA network services and utilities. No modification is necessary for this file to be merged into the GENERIC TASK IMAGE.

The LAST.EXE PCSA component 106 provides Local Area System Transport protocol (LAST) transport services for accessing the virtual service LAD disk 17 on the VAX server 16 through the data link and transferring the LAD disk data to the LAD disk image created in XMS. No modification is necessary for this file to be merged into the GENERIC TASK IMAGE.

The LAD.EXE PCSA component 108 provides services to an application program to handle Direct Access Disk (DAD) protocol for directly accessing the virtual service LAD disk 17. No modification is necessary for this file to be merged into the GENERIC TASK IMAGE.

The LAD_MASK.EXE component 112 is a LAD disk image handler which is designed particularly for the generic remote boot procedure and as such cannot be loaded in a regular MS-DOS environment. LAD_MASK.EXE provides the special disk I/O interrupt handler which services interrupt vector INT 13H by intercepting and directing all disk I/O calls to the LAD disk image in XMS. This special interrupt handler is loaded into the PC conventional memory area through a standard terminate and stay resident (TSR) procedure. Since the LAD disk image is stored in the XMS extended memory area, this handler provides protected mode addressing to allow other routines access to the LAD disk image.

Any operational version of the .EXE files may be used in the GENERIC TASK IMAGE, rather than rebuilding the GENERIC TASK IMAGE each time a standard .EXE file changes, since these components are used to establish a network only in the preliminary stages of the boot process and then discarded. Furthermore, the GENERIC TASK IMAGE may be easily updated when desired by simply linking updated versions of the .EXE files when building the new GENERIC TASK IMAGE.

GENERIC FLOPPY REMOTE BOOT PROCEDURE

The Generic Floppy Remote boot procedure will now be discussed in detail. The generic remote boot procedure may be initiated by booting the client PC from a specially configured Floppy Remote Boot Diskette loaded into a local floppy disk drive, typically drive "A:" of the client PC. Unlike the jumper remote boot procedure, discussed in detail below, the Floppy Remote Boot procedure does not require the adapter specific data link layer module (21, FIG. 2) and MOP module (29, FIG. 2) to be resident in ROM on the adapter to download the GENERIC TASK IMAGE. Rather, all necessary network components for the GENERIC TASK IMAGE MOP downloading operation resides on a specially configured Floppy Remote Boot Diskette.

To build the Floppy Remote Boot Diskette capable of performing the generic floppy remote boot procedure, a preformatted diskette (without system) is needed. A floppy disk media builder places a special boot sector on the preformatted floppy diskette, and then copies all files necessary for the generic floppy remote boot procedure onto the diskette. These generic floppy remote boot files for a PC client with an NDIS adapter are GFRBCP.BIN, PROTMAN.SYS, NDISDRV.SYS, DLLNDIS.EXE, NETBIND.EXE, PROTOCOL.INI, and GFRBCON.EXE, described below in detail.

GFRBCP.BIN is the main generic floppy remote boot control program binary image and is the very first file in the DOS directory area of the floppy disk, i.e., located immediately after the boot sector. This file must be stored on contiguous sectors of the floppy diskette and placed where the MS-DOS IO.SYS or IBMIO.COM file usually resides. This module emulates a good amount of the MS-DOS functions of IO.SYS, MSDOS.SYS and COMMAND.COM to provide an MS-DOS-like environment so that the other generic floppy remote boot files can be loaded from the floppy disk and executed as though the actual MS-DOS environment existed.

PROTMAN.SYS is the Protocol Manager driver for the NDIS networking environment and is available from Microsoft. Normally a Protocol Manager driver is loaded and initialized by the MS-DOS operating system during system configuration, i.e., during execution of CONFIG.SYS. However, in the case of the generic floppy remote boot procedure, execution of the GFRBCP.BIN control program image starts the PROTMAN.SYS Protocol Manager driver, i.e., since no execution of CONFIG.SYS occurs.

NDISDRV.SYS is the NDIS MAC driver (23, FIG. 2) for a specific NDIS network adapter, and DLLNDIS.EXE implements the PCSA data link layer (25, FIG. 2) for the NDIS environment. Both modules are loaded and executed by the GFRBCP.BIN generic floppy remote boot control program.

PROTOCOL. INI is a file which contains configuration information for the NDISDRV.SYS MAC driver and all protocol modules which intend to talk to the PROTMAN.SYS driver. When the PROTMAN.SYS driver is started it reads PROTOCOL.INI and uses it to create a configuration memory image which is passed to the protocol modules that intend to talk to the MAC driver. When a different network adapter is installed in the PC this file needs to be updated as described in the NDIS technical specifications.

NETBIND.EXE is a utility program provided for use with the PROTMAN.SYS Protocol Manager driver. The NETBIND.EXE module is started by the GFRBCP.BIN generic floppy remote boot control program after the PROTMAN.SYS, NDISDRV.SYS and DLLNDIS.EXE modules are loaded, and it initiates the binding, i.e., communication between the data link layer and the MAC driver, and operational startup of these modules.

GFRBCON.EXE is the configuration program module for the Generic Floppy Remote Boot procedure. When this program is executed it requests the MAC device driver name, e.g., DEPCA.DOS for a DEPCA adapter, or NDISDRV.SYS for an NDIS adapter. The MAC driver file name should be the same as that used in the MS-DOS CONFIG.SYS system configuration file (e.g., DEVICE=DEPCA.DOS or DEVICE=NDISDRV.SYS) to prevent confusion. The GFRBCON.EXE configuration program also requests the network adapter name, which should be available from the PROTOCOL.INI network protocol file. If GFRBCON.EXE cannot find the network adapter name of the requested network adapter in the PROTOCOL.INI file, it displays an error message and halts execution of the generic remote boot procedure. If GFRBCON.EXE finds the network adapter name in the PROTOCOL.INI file, it displays the network adapter name found, updates the binding information for the datalink in PROTOCOL.INI on the floppy disk and renames the original PROTOCOL.INI on the diskette to PROTOCOL.BAK. GFRBCON.EXE also creates a configuration file CONFIG.DAT on the floppy disk which is used by GFRBCP.BIN to determine the network adapter type for the generic floppy remote boot procedure.

Figure 4:
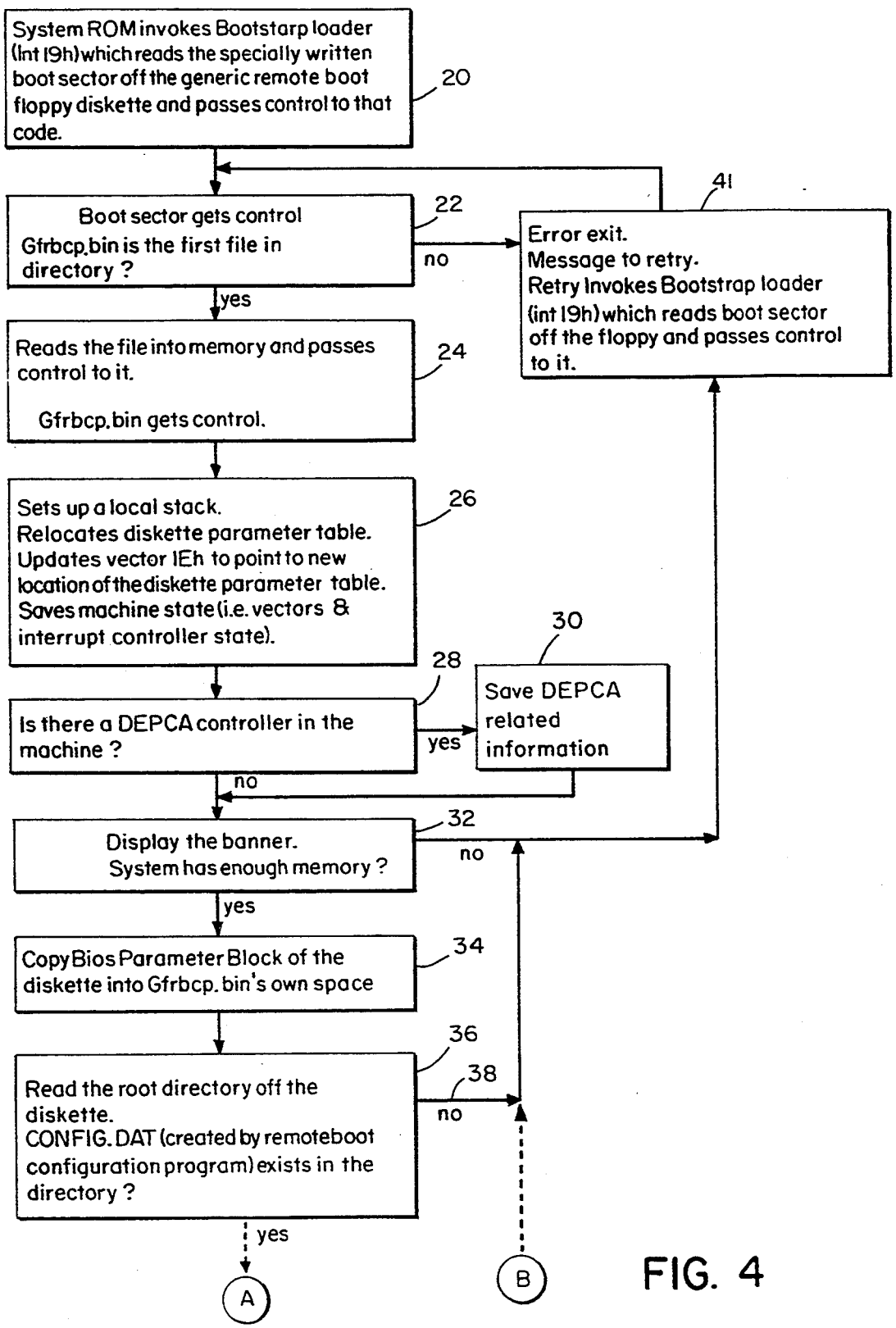
FIG. 4 is a flow chart diagramming the generic remote boot procedure of this invention.
Figure 5:
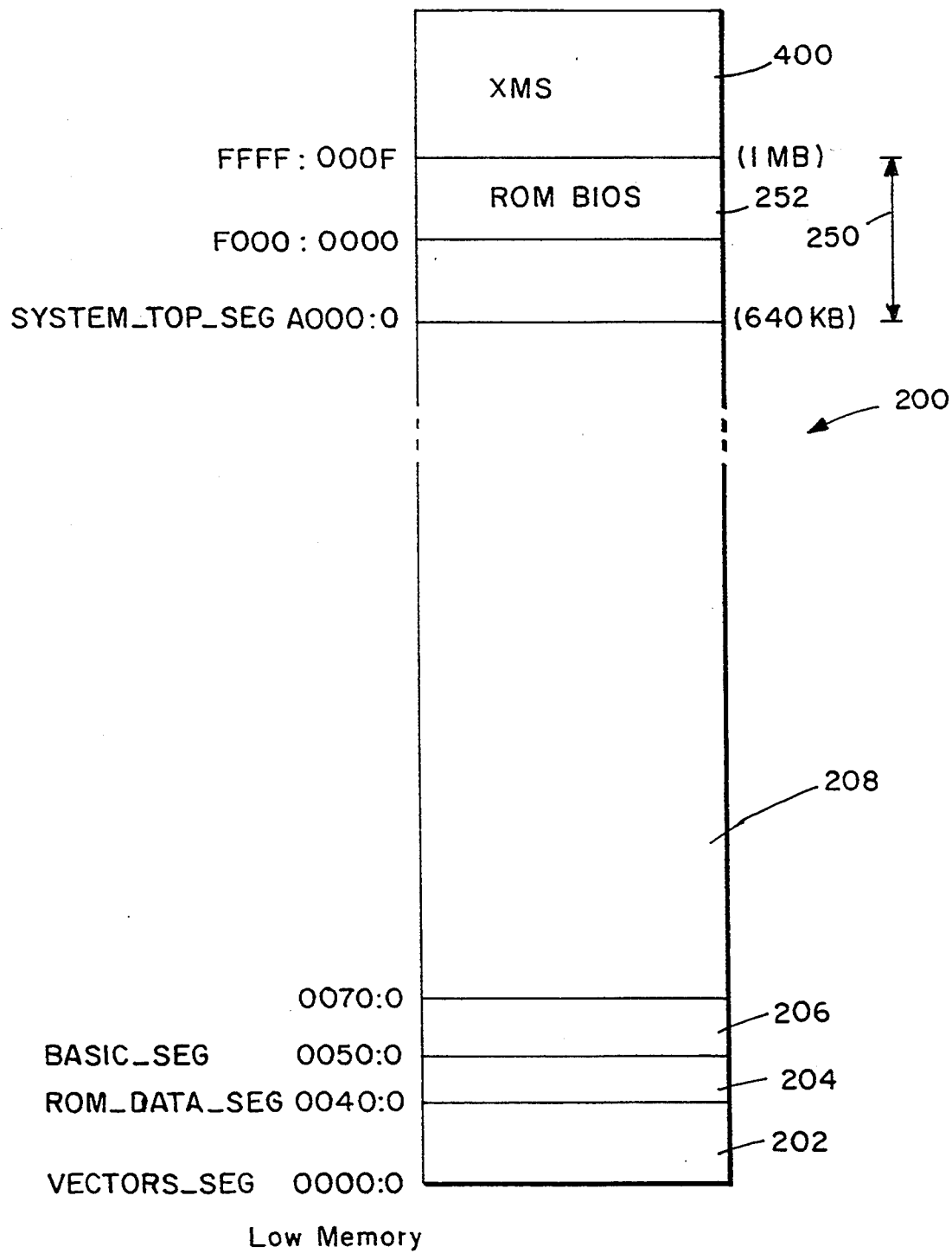
FIG. 5 is a memory map diagram showing the general memory layout of the client PC performing the generic remote boot procedure of this invention.

Referring to FIG. 4, the flow chart of the operating sequence of the Generic Floppy Remote Boot procedure will now be described. Referring also to FIG. 5, there is shown the client PC memory map 200 which describes the memory segment layout of the client PC system to be remote booted. Each data byte of the physical memory space is described by addresses in the form of XXXX:YYYY, where XXXX is the hexadecimal address of a memory segment incremented in 16 byte paragraphs, and YYYY is the hexadecimal offset of the desired physical address relative to segment address XXXX. This format corresponds to the CPU address register format of CS:IP where CS is the segment address and IP is the instruction pointer relative to the CS segment address. For example, a physical address of 03FFH may be represented in the form of Q000:03FF, 0010:02FF, 0030:00FF, etc..

Generally, the PC memory structure is divided into a conventional address space which begins at low memory address 0000:0000 and ends at high memory address SYSTEM_TOP_SEG A000:0000 ("640 KB"), an expanded memory space (EMS) 250 which begins at A000:0000 and ends at FFFF:O00F ("1MB"), and an extended memory space (XMS) 400 which begins above FFFF:000F but cannot be directly addressed by the CS:IP register.

Memory map 200 shows several reserved memory segments in the conventional memory space, including a memory segment VECTORS_SEG 202 (0000:0000 to 0000:03FF) reserved for interrupt vectors, a memory segment ROM_DATA_SEG 204 (0040:0000 to 0040:00FF) reserved for ROM BIOS data, and a memory segment BASIC_SEG (0050:0000 to 0060:00FF) reserved for BASIC.

The memory segment 208 starting at 0070:0000 is typically used to load the MS-DOS IO.SYS or IBMIO.COM file during a normal boot operation. However, this area is available for Floppy Generic Remote Boot to use as a data storage area since there is no need to load either IO.SYS or IBMIO.COM during the first stage of the floppy remote boot operation.

Upon client PC system power-up, control passes 20 (FIG. 4) to the ROM BIOS 252 (FIG. 5), located in the expanded memory space 250, which performs a standard power-up procedure. Upon completion of the ROM BIOS power-up procedure, the ROM BIOS issues an INT 19H interrupt to begin bootstrap loading the operating system. The PC system responds to the INT 19H by loading the boot sector from the Generic Floppy Remote Boot diskette into memory segment BPB$_{13}$ LOAD 210 (07C0:0000) as shown in FIG. 6.

Figure 6:
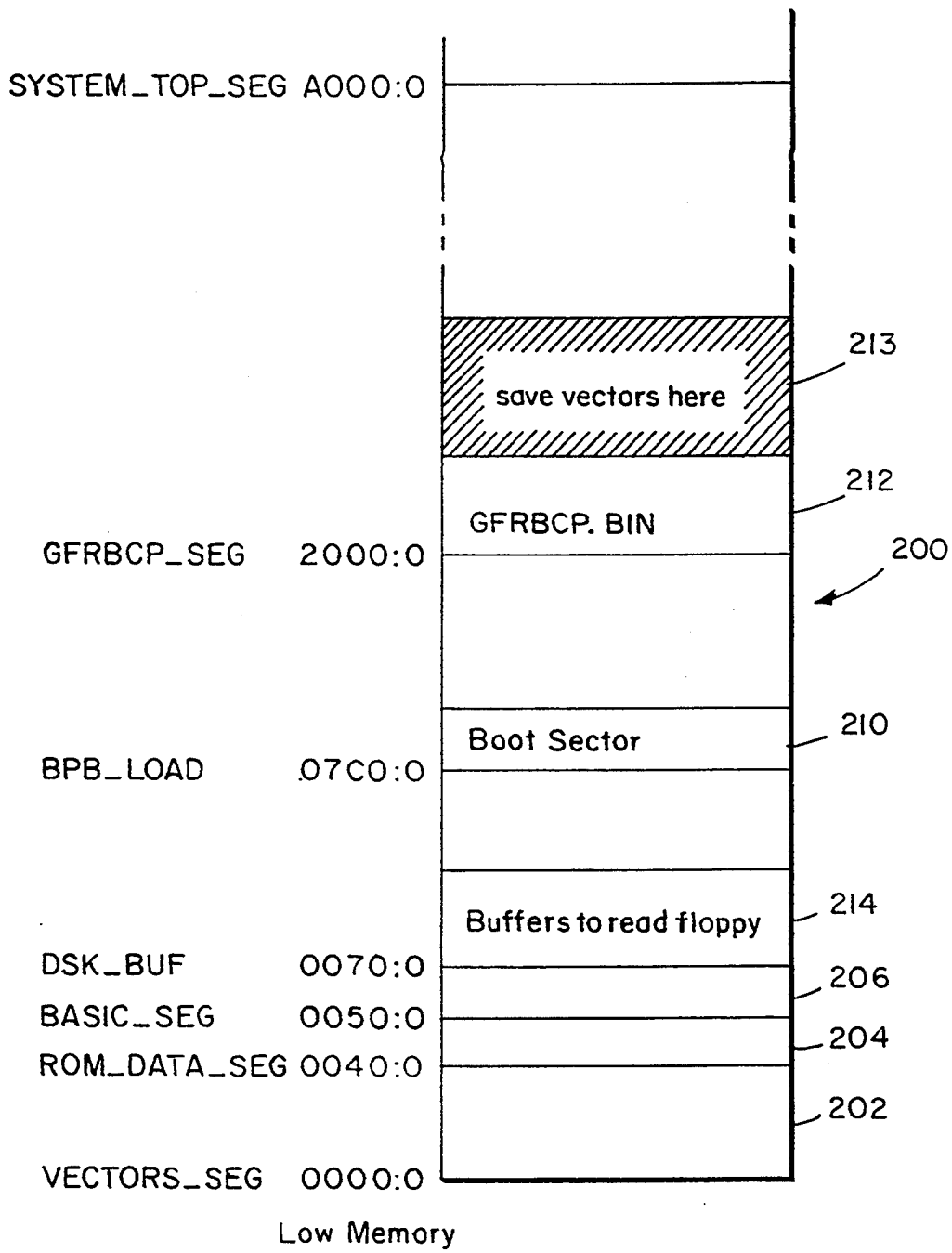
FIGS. 6, 7, 8, 9, and 10 are memory map diagrams showing the successive states of the client PC memory as the generic floppy remote boot procedure progresses, i.e., the load of the boot sector, load of the root directory, assignment of a NDIS execution area, load of execution terminate and stay resident modules, and the load of the LAD MASK.EXE module.

The boot sector stored in the BPB_LOAD memory segment takes control 22 (FIG. 4) of the client PC system and sets up a diskette parameter table (DPT), determines the boot drive and resets the disk I/O system, determines that the floppy remote boot system files discussed above are in the right places, e.g., GFRBCP.BIN should be the first file in the DOS directory, and then loads 24 GFRBCP.BIN into memory segment GFRBCP_SEG 212 (2000:0000) as shown in FIG. 6.

If the GFRBCP.BIN control program is not found as the first file in the DOS directory, then the system generates 41 a boot error message to retry the floppy boot, i.e., instructs the user to insert the proper remote boot floppy diskette into the local floppy disk drive, and then reinvokes the bootstrap loader to reboot the system.

The GFRBCP.BIN floppy remote boot control program now takes control of the generic boot procedure. GFRBCP.BIN sets up 26 a local stack and then relocates the floppy diskette parameter table to a safe area in the GFRBCP_SEG memory segment so that the GENERIC TASK IMAGE will not destroy the parameter table when it is downloaded from the VAX server. GFRBCP.BIN also sets the diskette parameter table vector to point to the new location of the parameter table.

GFRBCP.BIN next saves the machine state immediately after the end of memory space of GFRBCP.BIN 212. This includes saving all the interrupt vectors from 0000:0000 to 0000:00FF of the VECTORS_SEG memory segment into a protected vector portion 213 of GFRBCP_SEG, and saving the 8259 peripheral interrupt controller (PIC) states to another protected portion of the GFRBCP_SEG.

GFRBCP.BIN also assigns a memory segment DSK_BUF 214 starting at 0070:0000 to be used as a buffer for reading data from the floppy diskette. This buffer is necessary to avoid direct memory access (DMA) overrun which may occur if the floppy disk data is loaded directly into its ultimate destination in memory.

GFRBCP.BIN next scans 28 the PC ROM address spaces to see if the system is using a DEPCA family network adapter, i.e., to find a DEPCA ROM signature. If GFRBCP.BIN recognizes that a DEPCA controller is present, then DEPCA related information is stored 30 for later use in the remote boot process.

GFRBCP.BIN next displays 32 a greeting banner to the operator and checks the system memory. If sufficient system memory is not found to be available, then a boot error message is generated 41 and the user is instructed to correct the problem and reinvoke the boot process. If sufficient system memory is available then the boot sector including the BIOS parameter block of the floppy diskette is copied 34 from the BPB_LOAD memory segment 210 (FIG. 6) to a protected portion of the GFRBCP_SEG segment.

Figure 7:
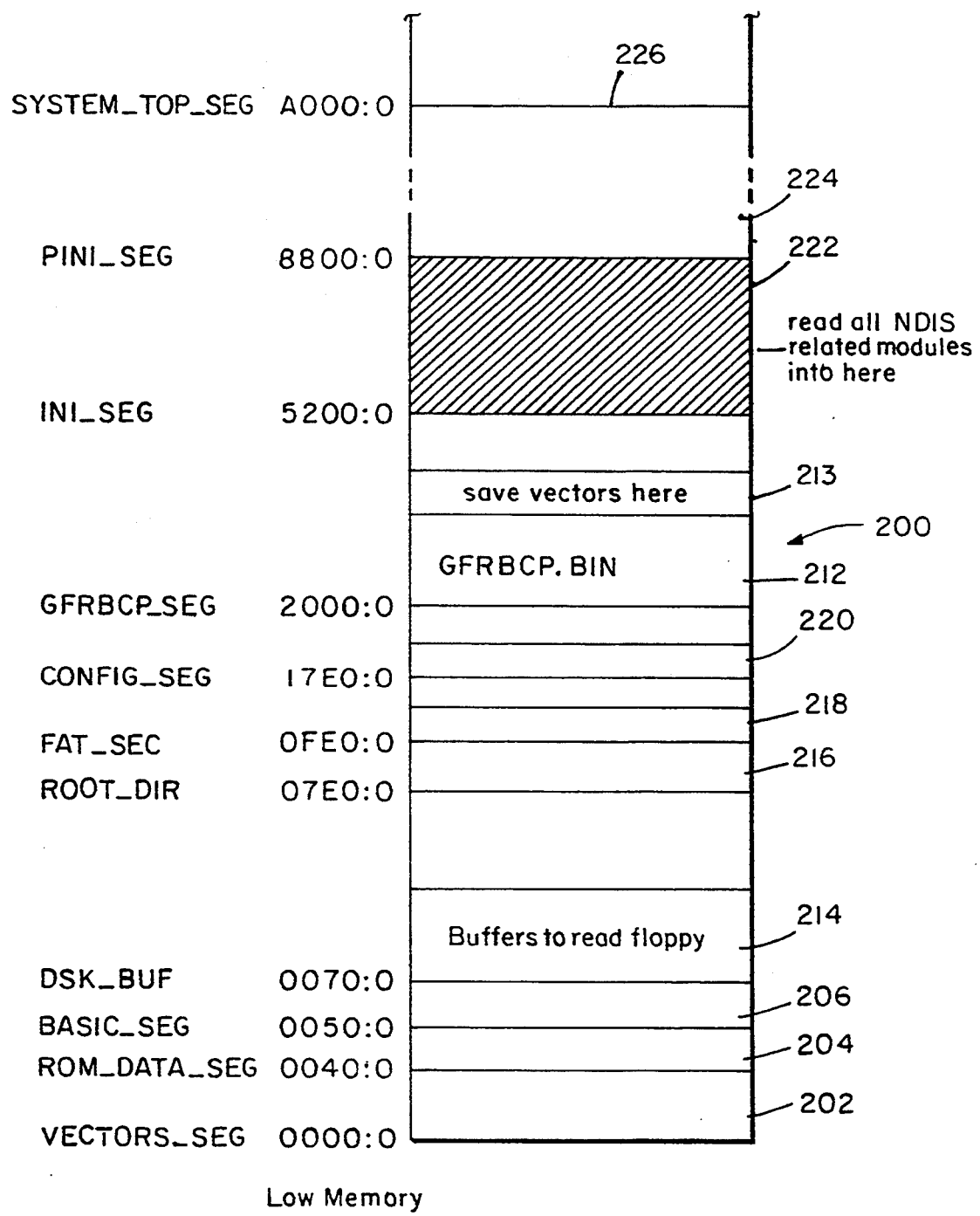

Referring to FIG. 7, the entire root directory of the Floppy Remote Boot diskette is read 36 off the floppy diskette and loaded into a ROOT_DIR memory segment 216 (07E0:0000), the file allocation table (FAT) sectors are read off the floppy diskette and stored in a memory segment FAT_SEG 218 (0FE0:0000), and the system boot configuration file CONFIG.DAT is read off the floppy diskette and stored in a memory segment CONFIG_SEG 220 (17E0:0000). If no CONFIG.DAT file exists 38 in the remote boot floppy disk directory, then a boot error message is generated 41 and the user is instructed to correct the problem and reinvoke the boot process.

GFRBCP.BIN next retrieves 40 the MAC driver name from the CONFIG.DAT data stored in CONFIG_SEG. For example, if the PC is installed with a DEPCA adapter the MAC driver name would be DEPCA.DOS, or if the PC is installed with an NDIS adapter the MAC driver name would be NDISDRV.SYS.

All the NDIS related modules, i.e., PROTOCOL.INI, PROTMAN.SYS, MAC.SYS, DLLNDIS.EXE, and NETBIND.EXE, are read 42 off the floppy diskette, stacked, and stored in a memory segment INI_SEG 222 (5200:0000) as shown in FIG. 7. The GFRBCP.BIN control program keeps track of these NDIS modules with a data structure which includes the module's name, the location of the segment where the module resides in memory, and the length of the module. These modules are restricted to occupy memory between the beginning of the INI_SEG segment, i.e., 5200:0000 (INI_SEG:0), and the beginning of a memory segment PINI_SEG 224 (8800:0000) which extends to the top of conventional memory SYSTEM_TOP_SEG 226 (A000:0000) and is reserved for use by the Protocol Manager driver PROTMAN.SYS. The starting memory location of PINI_SEG is determined by

PINI_SEG:0 = SYSTEM_TOP_SEG − PROTMAN_OFFSET
= A000:0000 − 1800:0000
= 8800:0000 where PROTMAN_OFFSET represents the amount of memory, i.e., 1800H 16-byte memory paragraphs, reserved for PROTMAN.SYS's transient part, and SYSTEM_TOP_SEG 226 is the address of the top segment of conventional memory. Thus, for a PC having a full 640K conventional memory, SYSTEM_TOP_SEG will be A000H and the starting address of PINI_SEG will be 8800:0000.

At this point, the GFRBCP.BIN floppy remote boot control program is ready to load and execute all NDIS modules. Although the MS-DOS system has not yet been loaded, the GFRBCP.BIN Floppy Remote Boot control program loaded from the diskette provides sufficient services to emulate an MS-DOS environment. As such, all of the NDIS drivers successfully load as though MS-DOS is already loaded and operating.

The source for the service routines that emulate the MS-DOS environment reside in an MS-DOS handler module, which is assembled as part of the GFRBCP.BIN program image. GFRBCP.BIN hooks 44 the MS-DOS interrupt vector INT 21H to point to the MS-DOS handler to allow the handler to service MS-DOS calls normally accessed through interrupt vector INT 21H.

GFRBCP.BIN also hooks 44 interrupt vector INT 22H to point to an NDIS loader routine portion of the GFRBCP.BIN control program which is responsible for loading and starting all NDIS related component modules such as PROTMAN.SYS, and the MAC driver DLLNDIS.EXE. The NDIS loader is designed to be accessed through a software interrupt call so that it can also be accessed by the GENERIC TASK IMAGE to be loaded later. GFRBCP.BIN further sets up variables that are required by the NDIS loader including BASE_SEGMENT, INI_SEGMENT, and INIT_SIZE. BASE_SEGMENT represents the starting memory address where the NDIS modules will be loaded for execution, INI_SEGMENT indicates the memory location where PROTOCOL.INI resides, and INI_SIZE contains the length of PROTOCOL.INI file.

Figure 8:
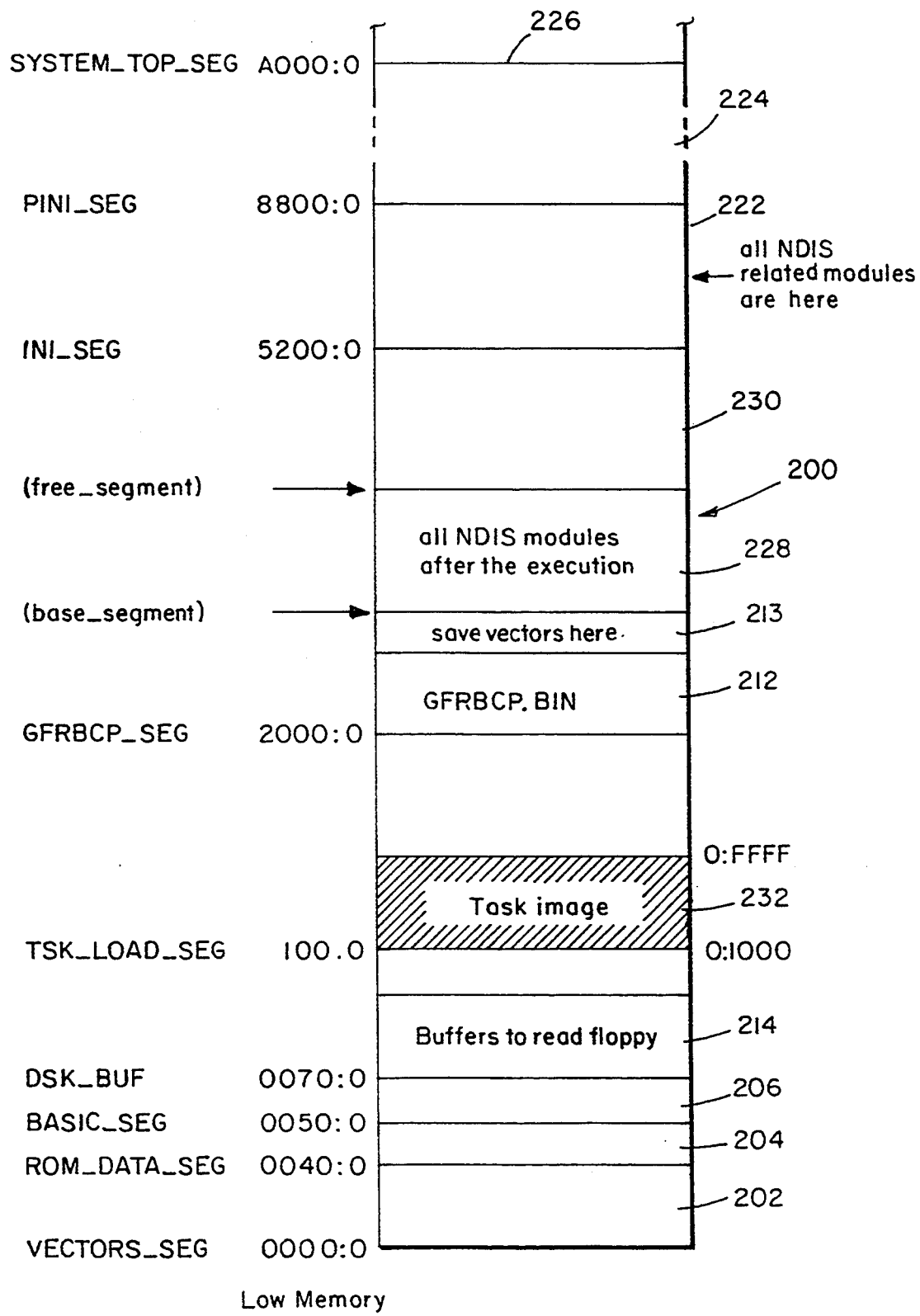

As shown in FIG. 8, an NDIS execution area 228 is assigned for the NDIS modules and begins at a memory location BASE_SEGMENT located immediately above the saved interrupt vector portion 213 of GFRBCP_SEG 212. The NDIS execution area 228 extends as far as memory location FREE_SEGMENT which must occur prior to the beginning of segment INI_SEG (5200:0000) where all of the NDIS related modules are stored. The NDIS loader is designed to use the NDIS execution area efficiently while executing all NDIS related modules. After the NDIS loader portion of the GFRBCP.BIN control program loads and executes all of the NDIS modules, the variable FREE_SEGMENT will be pointing to the beginning of a free memory area 230 which may be used later by the GENERIC TASK IMAGE.

Once the GFRBCP.BIN floppy remote boot control program sets up the NDIS environment just described, it invokes 46 the NDIS loader via a software interrupt call to interrupt vector INT 22H to start execution of all NDIS modules and thereby commence network communications. GFRBCP.BIN reads 48 the hardware address from the adapter via a data link call, displays the hardware address on the PC screen, and issues 50 a MOP request to download the GENERIC TASK IMAGE from the VAX/VMS server 16 (FIGS. 1a–1c). If the GENERIC TASK IMAGE is received successfully from the server, control is passed 52 from the GFRBCP.BIN control program to the GENERIC TASK IMAGE. Otherwise, GFRBCP.BIN resumes 54 control and performs an error handling procedure to terminate the floppy remote boot procedure.

The GENERIC TASK IMAGE is downloaded from the server, using the MOP protocol, to a GENERIC TASK IMAGE memory segment TSK_LOAD_SEG 232 (0100:0000) in the system's conventional memory space. The GENERIC TASK IMAGE size is limited to 1F00H 16-byte segments, i.e., 2000:0000- 0100:0000, to avoid overlapping GFRBCP.BIN which still exists in memory segment GFRBCP_SEG. The start location of TSK_LOAD_SEG is also critical since it must avoid the ROM BIOS stack space (ROM_DATA_SEG) which must be contained below address 0100:0000 to avoid a memory conflict with the GENERIC TASK IMAGE.

During the downloading time of the GENERIC TASK IMAGE, the VMS server 16 (FIGS. 1a-1c) informs the client PC where to load the GENERIC TASK IMAGE in the client PC's memory. This load location is always in the form of 0:xyz0 where x, y and z can be any hexadecimal number. For the case shown in FIG. 8, 0:xyz0 is 0:1000. When the GENERIC TASK IMAGE begins execution CS:IP is 0:xyz0. Since the GENERIC TASK IMAGE compiler (e.g., MS-ASM assembler available from Microsoft) generates offset values for the GENERIC TASK IMAGE based on ORG 0, i.e., all address offsets are calculated relative to address 0000:0000, the first thing the GENERIC TASK IMAGE does is to convert 56 the CS:IP from 0:xyz0 to xyz:0, i.e., from 0:1000 to 100:0.

GENERIC TASK IMAGE next determines 58 the memory location of the PINI_SEG memory segment, i.e., by calculating PINI_SEG = SYSTEM_TOP_SEG - PROTMAN_OFFSET.

GENERIC TASK IMAGE then determines 60 whether the system is executing a jumper remote boot procedure, i.e., for a DEPCA ROM adapter set for jumper remote boot, or a floppy remote boot procedure for any type of adapter. This is easily determined by examining the contents of interrupt vector INT 21H. If the segment part of INT 21H is pointing to GFRBCP_SEG (i.e., 2000:) then the system is performing a floppy remote boot procedure since the GFRBCP.BIN floppy remote boot control program sets up the INT 21H vector to point to the GFRBCP_SEG.

Once the GENERIC TASK IMAGE determines that a floppy remote boot procedure is in progress 62, it continues as follows. GENERIC TASK IMAGE sets 64 the CPU stack pointer to the highest offset of the GENERIC TASK IMAGE's TSK_LOAD_SEG code segment, i.e., SS:SP = CS:FFFE = 0100:FFFE. Next, GENERIC TASK IMAGE gets the start address of the free memory area 230 above the NDIS module execution area 228, i.e., the location pointed to by variable FREE_SEGMENT, and saves it in another variable CURRENT_LOAD_SEG.

GENERIC TASK IMAGE then performs some housekeeping steps including unloading 66 the network by restoring the machine state to the system state saved prior to starting the network. This step is necessary to prevent problems caused by the uncertain state of the network and allows the client PC to be restarted fresh. GENERIC TASK IMAGE also restores the interrupt vector INT 22H to point to the NDIS loader and the interrupt vector INT 21H to point to the MS-DOS environment emulation, both installed earlier by the GFRBCP.BIN control program. GENERIC TASK IMAGE then reinvokes the network by issuing an INT 22H call to restart 68 the NDIS loader, and displays 70 the GENERIC TASK IMAGE banner on the system display screen.

GENERIC TASK IMAGE contains a loading table (LOAD_TABLE) near the beginning of the GENERIC TASK IMAGE code that contains information about its network related component modules GTSKCP.EXE, SCH.EXE, LAD_MASK.EXE, LAST.EXE, LAD.EXE, and DLLND.EXE, discussed above. The data structure used to keep track of the information of each module is TSK_STRUC which has the following fields:

```
TSK_STRUC       STRUC
   SCRATCH_WORD         DW 0
   MODULE_EXE_SEG       DW 0
   MODULE_CODE_SEG      DW 0
   MODULE_CODE_LEN      DW 0
   MODULE_RESRVED       DW 5 DUP(0)
TSK_STRUC       ENDS
``` where SCRATCH_WORD contains the address of a scratch area, MODULE_EXE_SEG contains the address of the module's .EXE header segment, MODULE_CODE_SEG contains the address of the module's code segment, MODULE_CODE_LEN contains a value indicating the length of the code segment, and MODULE_RESERVED is a five-word field reserved for future usage. The data for the TSK_STRUC block is set up when the GENERIC TASK IMAGE is built by a GENERIC TASK IMAGE linking program LNK_GTSK.EXE.

At this point in the Generic Floppy Remote boot procedure the GENERIC TASK IMAGE has not been relocated yet. The value in the TSK_STRUC should still be valid. However, just to be certain, the MODULE_EXE_SEG and the MODULE_CODE_SEG modules are adjusted 72 for relocation.

Figure 9:
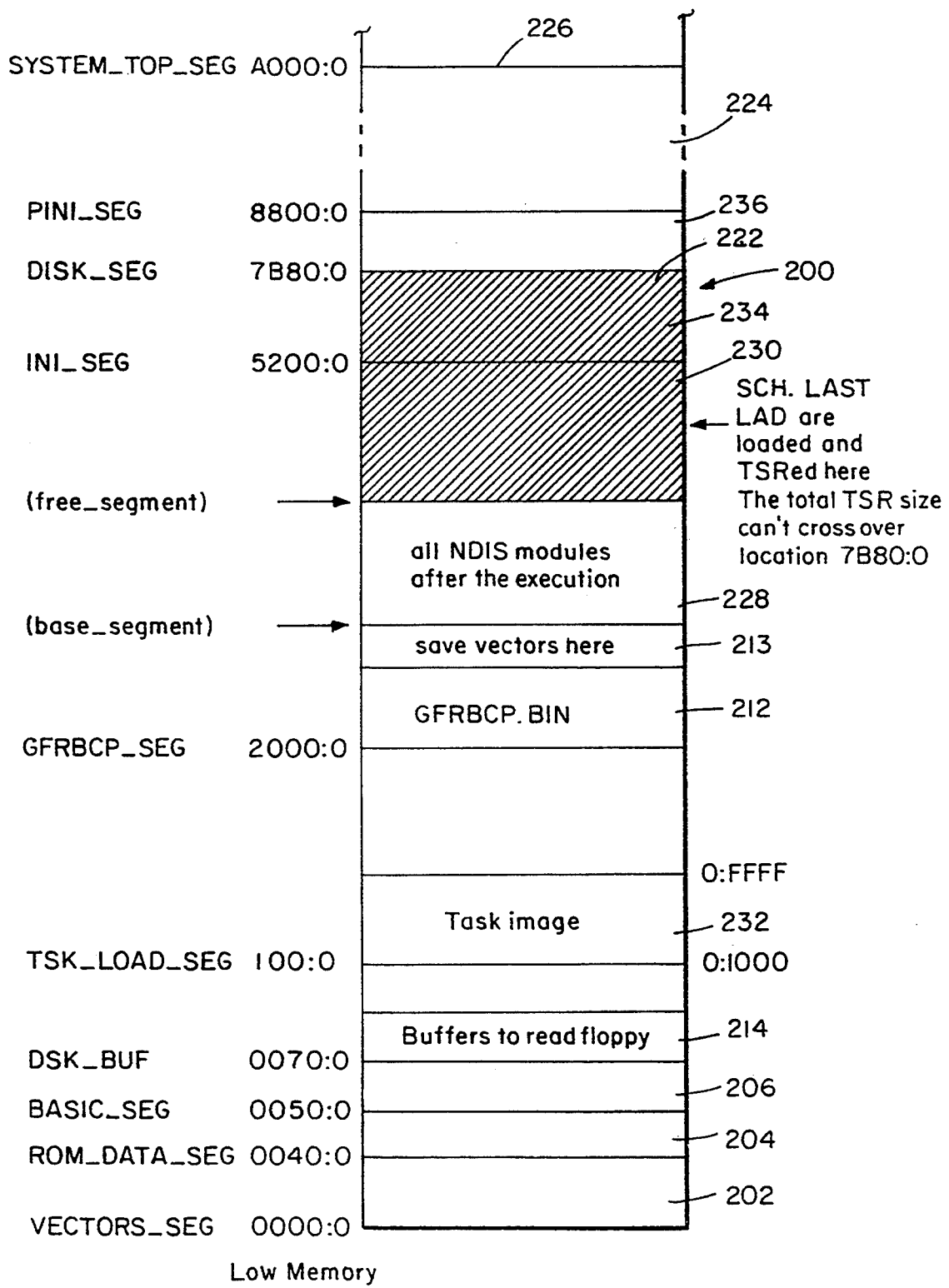

Referring again to FIG. 9, the GENERIC TASK IMAGE next loads 74 for execution terminate and stay resident (TSR) modules SCH.EXE, LAST.EXE, and LAD.EXE starting at FREE_SEGMENT into the free memory segment 230 and a portion 234 of the INI_SEG memory segment 222. It is appropriate to TSR these modules into the NDIS module storage area since the stored copies of the NDIS modules are no longer required. GENERIC TASK IMAGE checks to see if the total TSR size for the SCH.EXE, LAST.EXE and LAD.EXE modules crosses into the DISK_SEG memory segment 236 (7B80:0000), which will be used as a buffer area for transferring data from the service LAD disk to the LAD disk image to be created in XMS. If it does, an error message is generated and the remote boot operation is terminated.

GENERIC TASK IMAGE next prepares to load the INT 13H LAD disk image handler LAD_MASK.EXE in memory as a TSR module. As discussed above, this INT 13H handler is a specially designed disk I/O driver which provides disk-like services for standard INT 13H calls by reading sectors off a virtual LAD disk image residing in the PC extended memory, i.e., a LAD RAMDISK. The LAD RAMDISK is a 1.2 MB disk image, or copy, of the remote LAD disk located on the VAX server and dedicated to remote boot a registered PCSA client PC. The details of copying the LAD disk into a LAD disk image in extended memory are discussed below.

Figure 10:
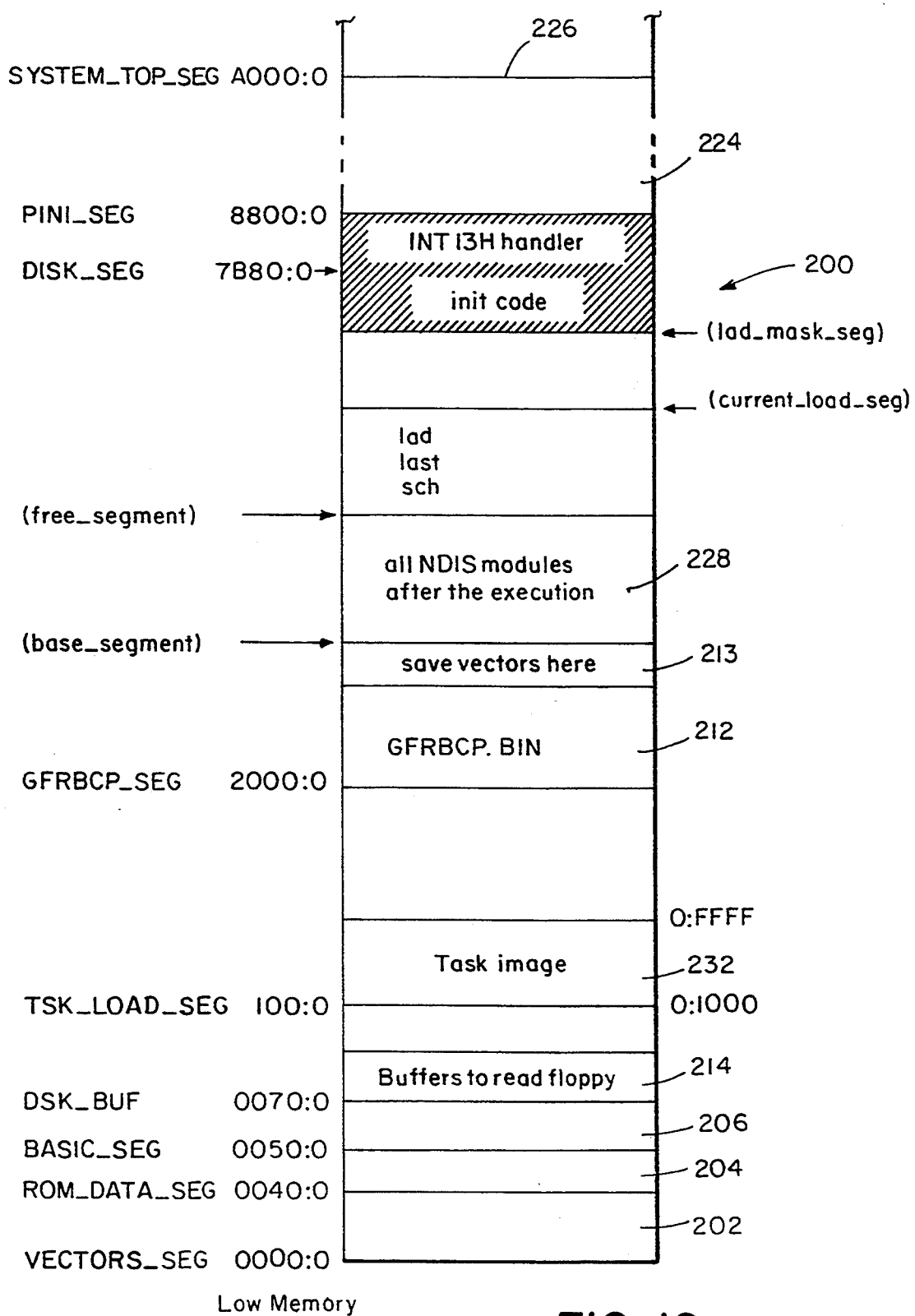

Referring to FIG. 10, prior to TSR loading the LAD_MASK.EXE module in memory, the GENERIC TASK IMAGE calculates the load location of the module so that the entire LAD_MASK.EXE module is fitted tightly toward the beginning of the PINI_SEG module 224 (8800:0000) without crossing into it. The calculated TSR load location for LAD_MASK.EXE is placed in variable LAD_MASK_SEG, but the module is not yet loaded.

GENERIC TASK IMAGE next begins to build the service LAD image in extended memory by activating 78 a special remote boot code in LAD.EXE which sets the LAD read/write transaction sizes to 1 LAD data track per transaction to simplify LAD data transfer and loading of the LAD disk image. GENERIC TASK IMAGE next obtains 80 the hardware address of the VAX server LAD disk dedicated for booting the client PC from the data link. The LAD disk hardware address returned from the data link is a series of 6 bytes, such as 08H, 00H, 02H, 00H, 01H, 02H, which is used to create the Service Name for the LAD disk. For example, the Service Name in this case will be the 17-byte character string "08-00-02-00-01-02".

GENERIC TASK IMAGE next calls LAD.EXE to solicit the network devices with the Service Name to obtain 82 a list of available servers for the requested Service Name. If a list of valid servers is returned from the network 83, then the system is connected 84 to the service LAD disk and remote boot continues. If it fails to connect, the remote boot procedure is terminated and a manual boot process is invoked.

Once the system is connected to the service LAD disk, the GENERIC TASK IMAGE reads 86 the boot sector from the connected LAD disk and places it in the standard boot segment location 0000:BPB_LOAD*10H, i.e., 0000:7C00. The GENERIC TASK IMAGE has a special routine READ_BOOT_SECTOR to handle this task which just reads the boot sector off the service LAD disk and into memory without jumping to execute the boot sector in memory, which would cause the client PC to immediately reboot from the service LAD disk. If GENERIC TASK IMAGE fails to read the boot sector off the service LAD disk, the remote boot procedure is terminated, an error message is generated, and a manual boot process is invoked.

Next, the GENERIC TASK IMAGE calls ROM BIOS via interrupt vector INT 15H (AH=88H) to determine the total available extended memory (XMS) and then checks to see if the extended memory size is large enough to fit at least the entire service LAD disk image. If there is insufficient extended memory, then the remote boot procedure is terminated, an error message is generated, and a manual boot process is invoked.

In preparing to copy the service LAD disk to the LAD disk image in XMS, the GENERIC TASK IMAGE calculates disk parameters for the service LAD disk by using information provided in the service LAD disk boot sector stored at 0000:BPB_LOAD,10h, i.e., 0000:7C00. These parameters include the service LAD disk track size in bytes, cylinder size in bytes, and the maximum number of cylinders. These calculated parameters are saved in a GENERIC TASK IMAGE data structure referred to by the variable name DISK_PARM.

Use of XMS as a LAD RAMDISK relies on "protected mode virtual addressing" to access XMS, since the physical address space of the XMS lies beyond the maximum real mode address directly accessible with the XXXX:YYYY form of addressing, i.e., FFFF:000F. There are several important differences between real mode and protected mode addressing, illustrated as follows by assuming access to a memory location via any segment:offset register, e.g., ES:BX (001A:003C). In real mode, the physical address of the location 001A:003C is calculated as 1AH, 10H+3CH=01DCH. In protected mode, however, the physical address for 001A:003C is quite different because the physical addresses for protected mode use 24 bits, which can directly access a maximum of 16 MB of XMS.

Figure 11:
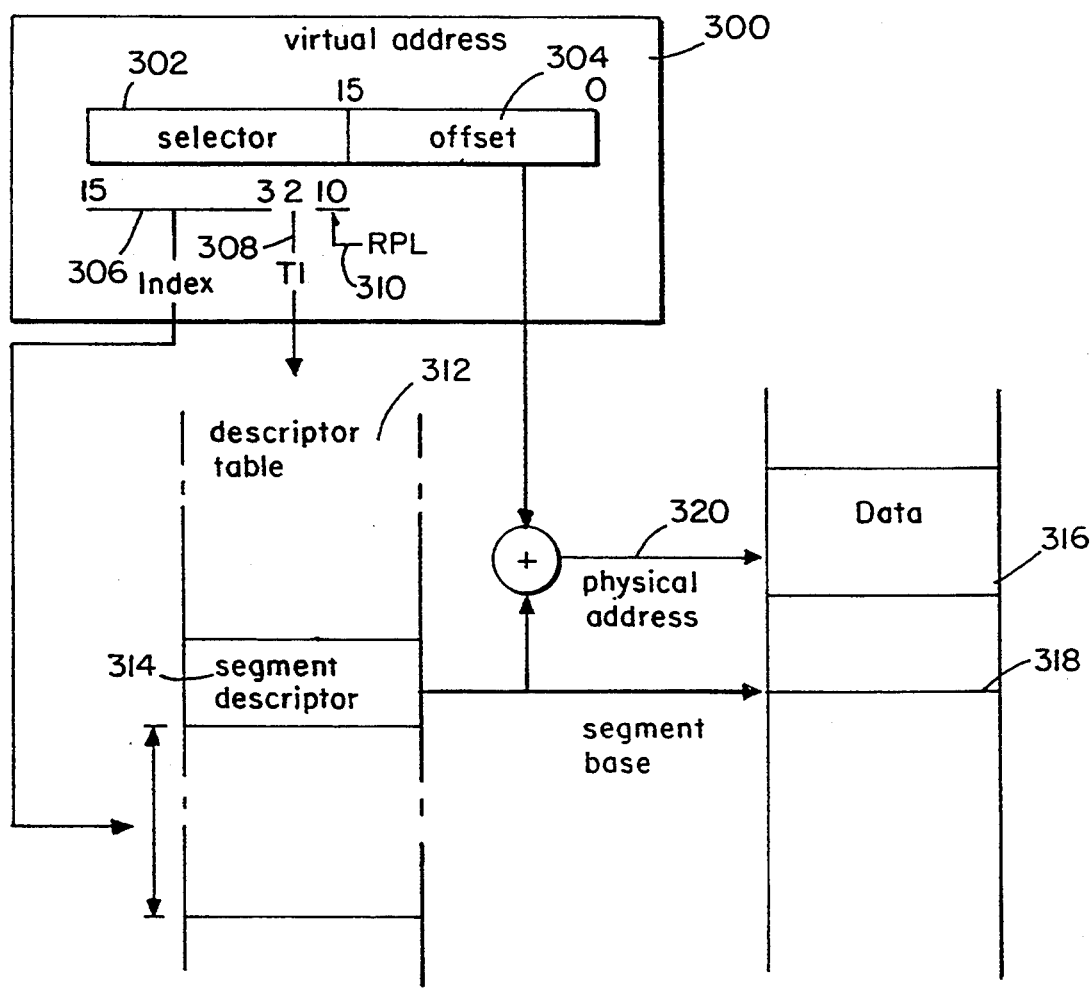
FIG. 11 is a schematic diagram illustrating the protected mode addressing scheme used by the generic remote boot procedure of this invention.

Referring to FIG. 11, a protected mode virtual address 300 consists of a 32-bit pointer to a particular physical location. The 32-bit address pointer 300 includes a 16-bit selector field 302 and a 16-bit offset field 304. The selector field 302 comprises a 13-bit table index portion (bits 3–15) 306, a 1-bit table indicator (TI) bit 308 (bit 2) for selecting between a local or global table, and a 2-bit RPL field 310 (bits 1-0) which is not involved in the selection of memory segments. The offset field 304 is an unsigned 16-bit integer that specifies the desired byte location within the segments selected by the selector field 302.

Translation of the protected mode virtual address to the physical memory address is shown in FIG. 11. The TI bit 308 of the selector field 302 is used to select a descriptor table 312, with 0 representing a global descriptor table, and 1 representing a local descriptor table. The index portion 306 of selector field 302 points to a segment descriptor 314 of descriptor table 312 which describes the parameters of the memory segment 316 accessed by the virtual address. The segment descriptor 314 is an 8-byte structure containing information about the selected memory segment such as the length of memory segment, the physical address of the start of the segment 318 (i.e., segment base), and the accessing mode to be used. The physical address 320 of the desired extended memory location is the sum of the offset field 304 and the starting physical address 318 of the segment obtained from the segment descriptor 314.

To determine the protected mode address for the example given here, ES:BX=001A:003C, the selector field 302 is loaded with the value 001AH (0000 0000 0001 1010) and the offset field 304 is loaded with the value 003CH. The index portion 306 of the selector field 302 is 3H, and the TI bit 308 of the selector field is 0 indicating the global descriptor table. Thus, the index value 3H locates the appropriate segment descriptor 314 within the global descriptor table 312, and from that segment descriptor structure, the physical segment base address 318 is found. If, for example, the physical segment base address (24 bits) is 01ABCDH, then 001AH:003C represents physical address (01ABCDH+3CH=01AC09H).

With regard to the floppy remote boot procedure, the GENERIC TASK IMAGE sets up a descriptor table including two segment descriptors, SOURCE_DES and TARGET_DESC, for transferring and storing the contents of the service LAD disk to the LAD disk image in XMS via the protected mode memory addressing.

Figure 12:
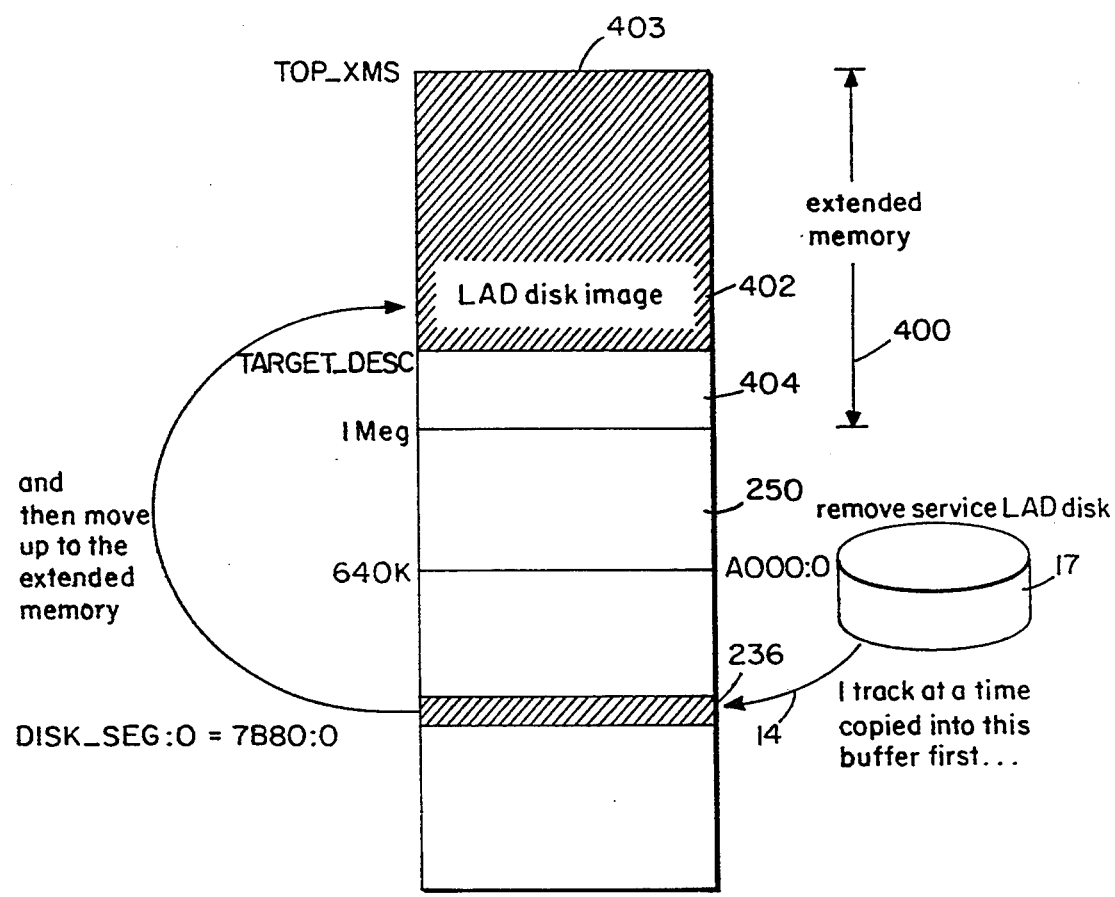
FIG. 12 is a memory map diagram illustrating the data transfer from the service LAD disk to the LAD disk image during the generic remote boot procedure of this invention.
Figure 13:
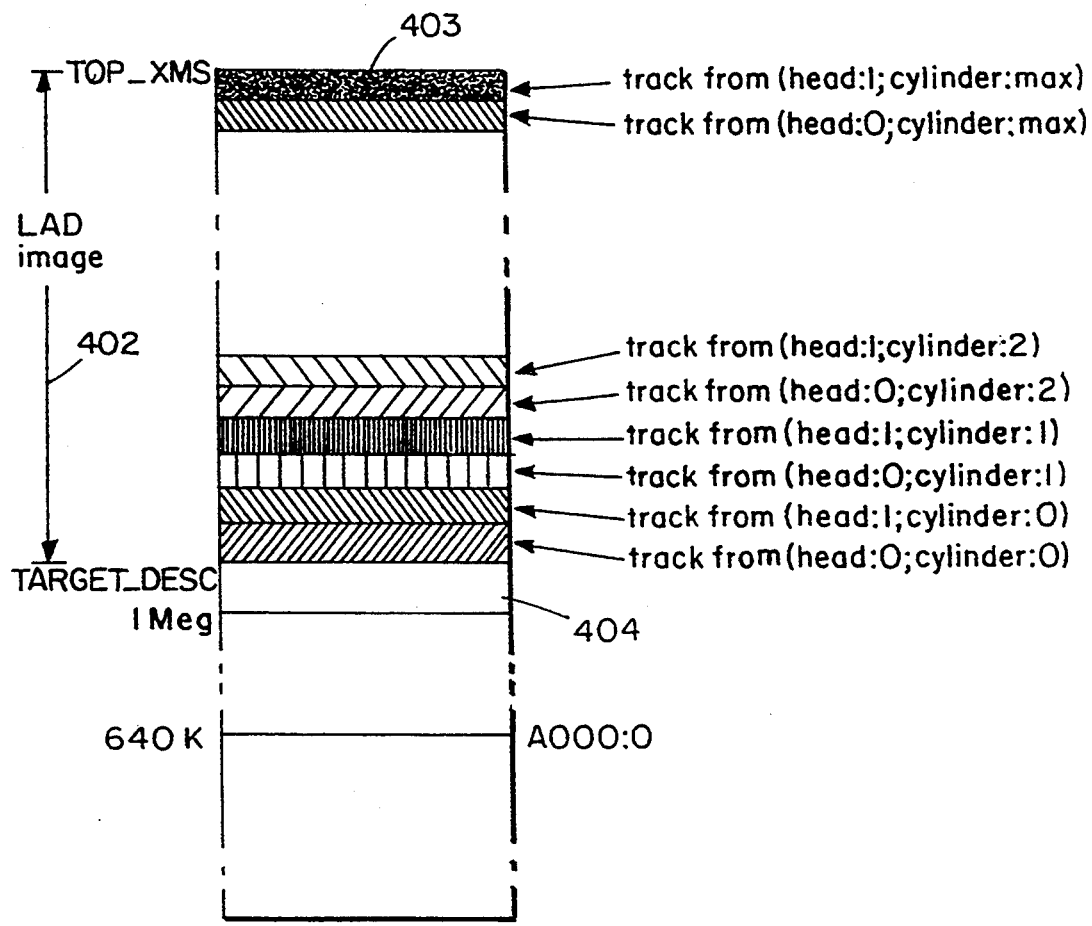
FIG. 13 is a memory map diagram showing the track mapping of the service LAD disk into the LAD disk image used by the generic remote boot procedure of this invention.
Figure 14:
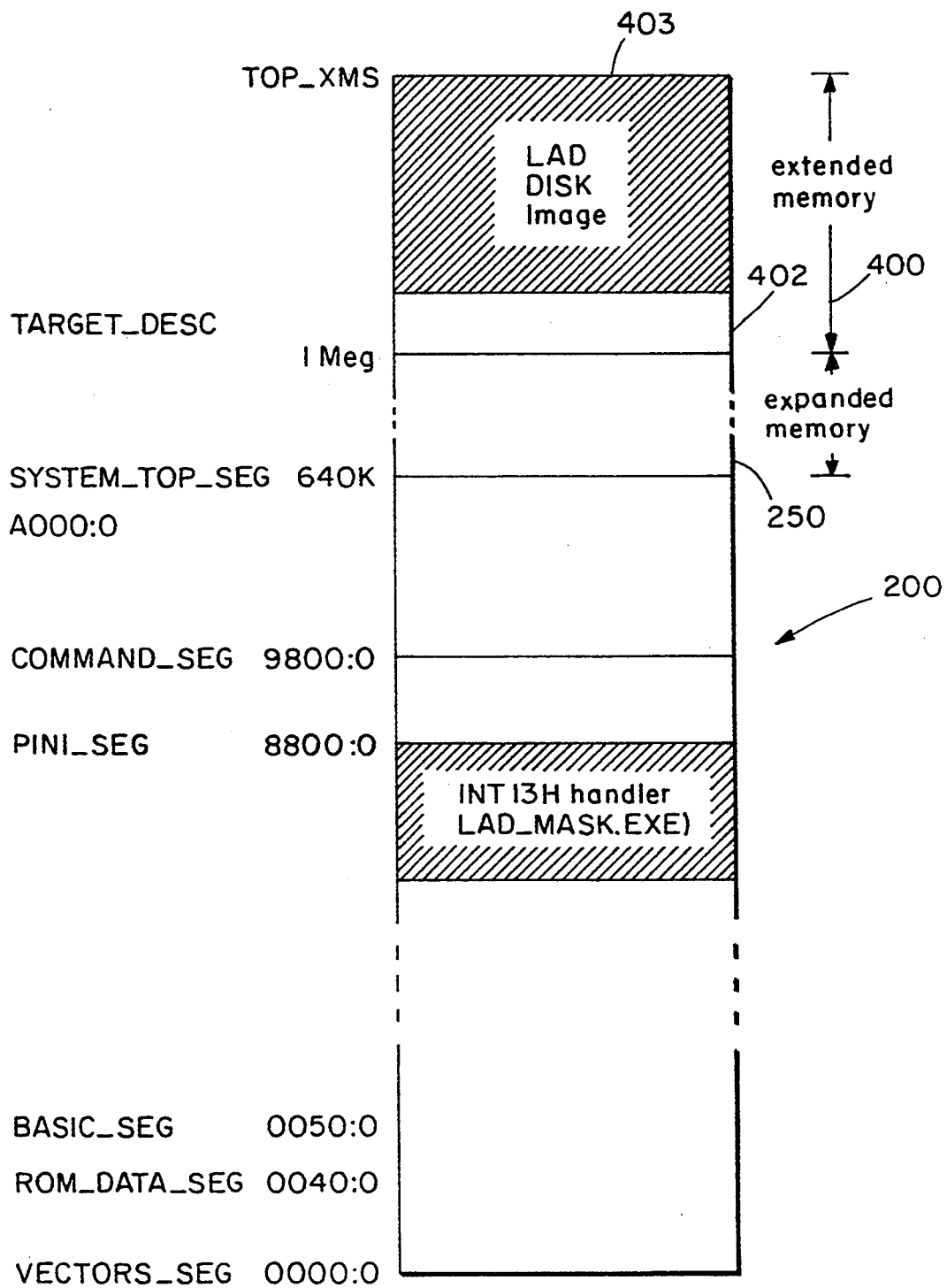
FIG. 14 is a memory map diagram showing the state of the PC client memory just prior to booting from the LAD disk image during the generic remote boot procedure of this invention.

Referring to FIG. 12, the base segment defined in descriptor SOURCE_DES is 7B800H, i.e., the segment address for the DISK_SEG memory segment 236 (shown in detail in FIG. 9), having a physical address in the first 640 KB conventional memory area. The DISK_SEG area is used as buffer space to temporarily store a track of data read off the service LAD disk when the service LAD disk is copied to the LAD disk image in XMS.

Descriptor TARGET_DESC defines the memory segment area 402 in the XMS region 400, to be used as the LAD RAMDISK for storing the LAD disk image. The base segment for the LAD RAMDISK area 402 defined in descriptor TARGET_DESC corresponds to a physical address of the beginning RAMDISK memory segment in the XMS region. LAD RAMDISK area 402 is defined in the XMS memory region so that the LAD disk image is loaded tightly against the top of the extended memory TOP_XMS 403. This allows for a slack region in XMS 402 between the beginning of XMS and the beginning of the LAD disk image area 404, i.e., TARGET_DESC, which MS-DOS may use to configure the XMS during the boot process without interfering with the LAD disk image.

Once the GENERIC TASK IMAGE has performed the above described steps to set up the LAD RAMDISK to receive the LAD disk image, GENERIC TASK IMAGE transfers 86 the contents of the entire service LAD disk to the LAD RAMDISK memory segment 402 one track at a time. Each track is separately read off the remote service LAD disk via the standard interrupt INT 13H call serviced by LAD.EXE and into the DISC_SEG buffer area 236. The track of LAD disk data stored in the DISC_SEG buffer area is then copied to the LAD ramdisk memory segment 402 in XMS via an interrupt INT 15H call which is handled by the ROM BIOS. FIG. 12 shows the track-by-track mapping of the service LAD disk into the resulting LAD disk image created in XMS.

Once the entire service LAD disk image has been copied to the LAD RAMDISK memory segment 402 in XMS, GENERIC TASK IMAGE disconnects the system from the service LAD disk, and the LAD.EXE and LAST.EXE modules are no longer required. The client PC is again removed from the network by restoring the machine state previously stored. GENERIC TASK IMAGE sets the DOS interrupt vector INT 21H to point to the MS-DOS service emulation routine in the GTSKCP.BIN control program portion of the GENERIC TASK IMAGE (FIG. 3), and sets up the environment to TSR load and execute the special LAD_MASK.EXE INT 13H disk I/O handler required for accessing the LAD disk image in XMS.

The area starting at location DSK_BUF:0080 (0070:0080) is used to store PSP data. The supplied parameter for LAD_MASK.EXE is the fixed vector number (FEH). Starting at the vector address (0000:FE*4), LAD_MASK.EXE uses two consecutive vector locations to store a five-byte JMP instruction, discussed below. If for any reason vector locations 0000:FE,4 and 0000:FF,4 cannot be used, the input PSP parameter to LAD_MASK.EXE is easily modified. Since the code for LAD_MASK.EXE is embedded in the GENERIC TASK IMAGE (FIG. 3), the starting location where LAD_MASK.EXE is executed and TSRed was precalculated and placed in a GENERIC TASK IMAGE variable LAD_MASK_SEG as described above.

GENERIC TASK IMAGE then loads and executes LAD_MASK.EXE which initializes itself, takes over control of interrupt vector INT 13H, and returns to the GENERIC TASK IMAGE. LAD_MASK.EXE is TSRed in the LAD_MASK_SEG memory segment which is located at a selected high end location, safe from application programs loaded into memory below this segment and areas of MS-DOS usage above this segment. That is, the LAD_MASK.EXE routine must remain unaffected in memory by the boot operation so that it may continue to redirect INT 13H calls to the LAD disk image during the boot operation.

One important function LAD_MASK.EXE provides is to set up the INT 13H interrupt vector to point to a location containing a 5-byte long instruction of JMP XXXX:YYYY, e.g., if the instruction is JMP 234:5678, then the five bytes are: EA, 78, 56, 34, 12. This JMP instruction resides in two consecutive fixed vector locations (0000:FE*4 and 0000:FF*4). The first static vector number (FEH) is from the PSP data passed in from the previous step. The location XXXX:YYYY of the JMP instruction points to the special INT 13H handler portion of LAD_MASK.EXE so that any disk operation call via INT 13H will be handled by LAD_MASK.EXE. The form of the JMP instruction ensures that the original INT 13H vector can be restored in the root of the INT 13H interrupt chain by simply modifying XXXX:YYYY to the original vector.

At this point the GENERIC TASK IMAGE has finished its duties and all modules necessary for further operation of the boot process, such as the LAD disk image in the LAD RAMDISK and the special INT 13H handler, are in place. The memory locations of these two modules have been carefully determined based on the memory usage behavior during the start up process of the standard MS-DOS operating system, and the execution characteristics of other modules.

The GENERIC TASK IMAGE relinquishes control by executing a jump into the copy of the boot sector at 0:7C00 of the LAD disk to begin booting the client PC from the LAD disk image. The PC system boot process for the LAD disk image is carried out similarly to the boot process for a bootable floppy diskette or hard disk. The difference in the LAD disk image case is that the disk I/O operations (INT 13H) are serviced by the special INT 13H handler installed through LAD_MASK.EXE, rather than by the regular INT installed from the ROM BIOS. The client PC network environment will be set up under MS-DOS control according to the system configuration files CONFIG.SYS, AUTOEXEC.BAT, and other batch files set up in the LAD disk image, which are identical to those files found on the service LAD disk. These could set up an NDIS environment, an environment with a proprietary data link, or an environment with LAST and LAD loaded into EMS memory to save conventional memory space, etc..

FIG. 15 shows typical CONFIG.SYS and AUTOEXEC.BAT files of the LAD disk image (copied from the service LAD disk). As shown, CONFIG.SYS does not require any special device driver related to generic.-remote boot, and the file can be modified to load different device drivers as desired. However, an important restriction on device drivers is that any added device driver must not overwrite the LAD RAMDISK segment 402 of XMS, i.e., where the LAD disk image resides.

The AUTOEXEC.BAT batch file executes just enough PCSA MS-DOS client components to allow re-connection to the service LAD disk over the network. AUTOEXEC.BAT starts DLLNDIS.EXE (if it is desired to enable the NDIS environment), SCH.EXE, DLLDEPCA.EXE (if it is desired to enable the proprietary DEPCA data link environment), LAST.EXE, and LAD.EXE. As soon as the connection to the service LAD disk is reestablished, the system is switched to the service LAD disk drive, COMSPEC is set, and another batch file START.BAT is run. It should be noted that the last three commands in the AUTOEXEC.BAT file have to go together immediately after the connection command. It is also important to note that AUTOEXEC.BAT must not execute any program which might overwrite the LAD RAMDISK segment 402 of XMS, i.e., where the LAD disk image resides.

The special INT 13H handler must relinquish its control after the system is booted off the LAD disk image and the connection is reestablished to the service LAD disk over the network. Thus, after the service LAD disk connection is made in AUTOEXEC.BAT, control is passed to START.BAT which immediately executes a program RESETLAD.COM. The RESETLAD.COM program issues a call to the special INT 13H handler to reset the root of the INT 13H chain to point back to the original INT 13H handler which was loaded from the ROM BIOS.

It should be noted that the commands in START.BAT could not have been incorporated directly into AUTOEXEC.BAT. This is because the disk drive is boot drive A: when MS-DOS executes AUTOEXEC.BAT. However, after it executes the following 2 lines in AUTOEXEC.BAT:

|decnet/use ?:/x/env=drive; and % drive % the drive is different, e.g., D:, which is the first available service LAD drive. However, MS-DOS continues to executed the AUTOEXEC.BAT file as though from drive A:. By executing another batch file, i.e., START.BAT, MS-DOS is coerced into switching to the current drive, e.g., D:.

The generic remote boot process is now complete, the client PC is connected to the service LAD disk, and there is no longer any restriction on executing a program which might overwrite the LAD disk image, since it is no longer required.

GENERIC JUMPER REMOTE BOOT PROCEDURE (DEPCA)

Jumper remote boot is a unique feature of the DEPCA family network adapter where the data link and MOP code reside in ROM located on the DEPCA adapter (DEPCA ROM) so there is no need for a floppy disk or other local bootable disk. The jumper remote boot function is enabled by presetting a jumper or switch on the DEPCA adapter circuit board. On system power-up, the DEPCA adapter invokes the data link and MOP code in the ROM to download the GENERIC TASK IMAGE over the network from the VAX server 16 (FIG. 1).

Referring again to FIG. 4, during system power-up, the DEPCA ROM gains control 51 from the system ROM BIOS and initializes the DEPCA adapter. The DEPCA ROM contains one section of code to run power-up diagnostics and another section of code for implementing the network data link. After the diagnostics procedure is complete, control is passed to the data link portion of the code. If data link code detects that the DEPCA adapter is set to perform a jumper boot operation, it will initiate the data link just enough to download the GENERIC TASK IMAGE from the VAX server.

The system then originates 50 a MOP download message to the VAX server and waits a period of time for the GENERIC TASK IMAGE to arrive. For older DEPCA adapters, the waiting period is set at 2.5 minutes. For newer DEPCA adapters such as Digital Equipment Corporation DEPCA adapter model numbers DE100, DE101, DE200, DE201, and DE210, the user can select from between a short waiting period of 30 seconds and a long waiting period of 2.5 minutes. If the waiting period times out before a GENERIC TASK IMAGE arrives at the system, the remote boot process is considered a failure and control passes back to the ROM BIOS to finish the system power-up procedures and report the failure.

The GENERIC TASK IMAGE is downloaded, using the MOP protocol, to a GENERIC TASK IMAGE memory segment TSK_LOAD_SEG 232 (0100:0000) in the system's conventional memory space. As with the floppy remote boot procedure discussed above, the GENERIC TASK IMAGE size is limited to 1F00H 16-byte segments, i.e., 2000:0000- 0100:0000. The start location of TSK_LOAD_SEG is also critical since it must avoid the ROM BIOS stack space (ROM_DATA_SEG) which must be contained below address 0100:0000 to avoid a memory conflict with the GENERIC TASK IMAGE.

The downloading of the GENERIC TASK IMAGE proceeds in the same manner described above with respect to the floppy remote boot procedure. That is, during the downloading time of the GENERIC TASK IMAGE, the VMS server 16 (FIGS. 1a–1c) informs the booted system where to load the GENERIC TASK IMAGE in the booted system's memory. If the system successfully receives the GENERIC TASK IMAGE from the VAX server before the waiting period ends, control is passed to the GENERIC TASK IMAGE.

As with the floppy remote boot procedure and referring also to FIG. 4, GENERIC TASK IMAGE first converts 56 the CS:IP from 0:xyz0 to xyz:0, i.e., from 0:1000 to 100:0. GENERIC TASK IMAGE next determines 58 the memory location of the PINI_SEG memory segment, i.e., by calculating PINI_SEG=SYSTEM_TOP_SEG - PROTMAN_OFFSET.

GENERIC TASK IMAGE then determines 60 whether the system is executing a jumper remote boot procedure or a floppy remote boot procedure. Again, this is easily determined by examining the interrupt vector for INT 21H. If the segment part of INT 21H is pointing to the floppy remote boot control program memory segment GFRBCP_SEG 212 (FIG. 5) (i.e., 2000:) then the system is doing floppy remote boot, because the GFRBCP.BIN floppy remote boot control program sets INT 21H vector to point to this memory segment. In the case of a jumper remote boot procedure, GFRBCP.BIN and its associated floppy remote boot modules have not been loaded into memory, and therefore INT 21H points elsewhere.

Once the GENERIC TASK IMAGE determines 61 that a jumper remote boot procedure is in progress, it scans the system memory space for the DEPCA ROM to determine 63 the DEPCA type. If the DEPCA ROM is not found, the jumper remote boot process ceases and an error message is generated. If the DEPCA ROM is found, and the adapter is an old DEPCA type (e.g., rev D, E, F, H), the GENERIC TASK IMAGE disables 65 the DEPCA ROM data link. If the DEPCA adapter found is a new DEPCA type, this step is not necessary.

At this point, ROM BIOS has not yet completed initializing all devices attached to the system. GENERIC TASK IMAGE must wait for the initialization to complete before proceeding to avoid unpredictable problems due to incomplete initialization. Therefore, GENERIC TASK IMAGE must pass control back to ROM BIOS, allow ROM BIOS to complete initialization, and then regain control from ROM BIOS.

Figure 16:
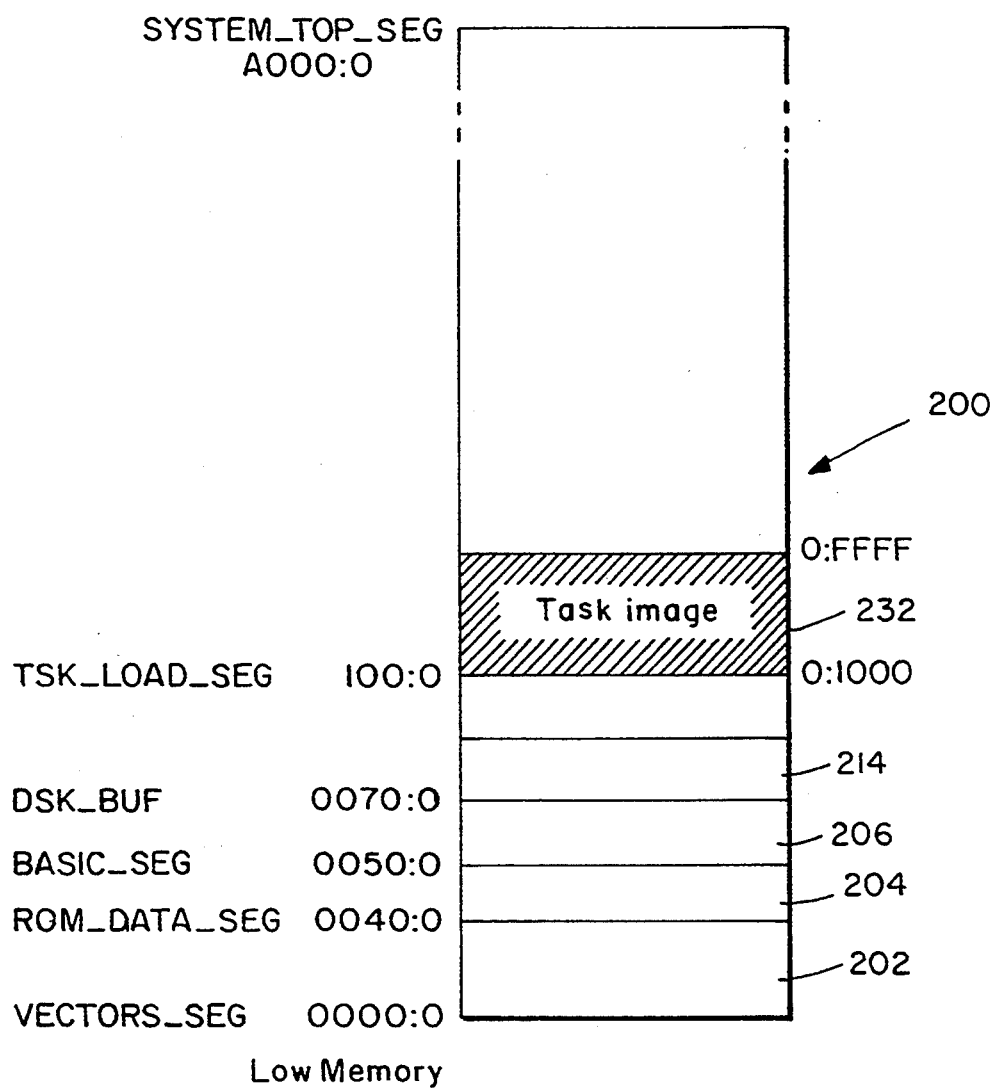
FIGS. 16, 17, and 18 are memory map diagrams showing the successive states of the client PC memory as the generic jumper remote boot procedure progresses, i.e., the memory position of the task image, the memory position of a copy of the task image, and the memory position of the interrupt handler initialize code.

However, before GENERIC TASK IMAGE passes control back to the ROM BIOS, GENERIC TASK IMAGE must be relocated 67 in memory to a saved area to prevent corruption of the GENERIC TASK IMAGE which might be caused by the ROM BIOS when it gains control. GENERIC TASK IMAGE checks the system memory, creates a copy of the GENERIC TASK IMAGE in a safe system memory segment PINI_SEG 224 (8800:0000) as shown in FIG. 16, and jumps to the relocated GENERIC TASK IMAGE. GENERIC TASK IMAGE then modifies 69 the existing boot strap interrupt vector INT 19H to point to the relocated GENERIC TASK IMAGE so that the relocated copy of the GENERIC TASK IMAGE will get control after ROM BIOS finishes with its power up procedure.

If the DEPCA adapter is rev E or newer, the system stack needs to be modified before turning control over to the ROM BIOS so that the return point to the ROM BIOS can be found appropriately. For rev E or newer DEPCA adapters the stack location for the return address to ROM BIOS is 12 bytes lower then for the older DEPCA adapters. For example, the stack for the newer DEPCA adapters should look like this prior to modification:

assuming that SS:SP=0:400, then

0:386+68 (3EE): BP used by ROM BIOS to determine if "Press F1 resume" should be displayed (cumulative errors)

0:386+6A (3F0): segment of INT 6D
0:386+6C (3F2): offset for INT 6D
0:386+6E (3F4): Flags for INT 6D
0:386+70 (3F6): return address for return short
0:386+72 (3F8): segment for ROM BIOS F000
0:386+74 (3FA): offset for ROM BIOS return GENERIC TASK IMAGE then passes control to the ROM BIOS by a far return (FAR RET) which completes its power-up initialization procedure. After the ROM BIOS finishes the power up initialization, it invokes the INT 19H bootstrap loader which gives control back to the GENERIC TASK IMAGE. The TASK IMAGE then 71 sets up the stack restores the boot strap interrupt vector INT 19H to point to the original boot strap handler in ROM BIOS. The GENERIC TASK IMAGE next checks to see if there is a floppy disk in the system floppy disk drive from which to boot. If a bootable floppy disk is present, the jumper remote boot process is terminated, and the client PC system will boot off the floppy disk. Otherwise, the system proceeds with the jumper remote boot procedure under the control of the GENERIC TASK IMAGE.

The GENERIC TASK IMAGE next relocates 73 the GENERIC TASK IMAGE from the safe memory area, i.e., memory segment PINI_SEG 224, to the original GENERIC TASK IMAGE memory location to which it was originally downloaded, i.e., memory segment TSK_LOAD_SEG 232, and jumps to the newly relocated GENERIC TASK IMAGE. GENERIC TASK IMAGE then sets up the stack pointer to reflect its new location in memory, displays 70 a GENERIC TASK IMAGE banner greeting, and proceeds with the remainder of the remote boot procedure.

As discussed above with reference to the floppy remote boot procedure, GENERIC TASK IMAGE contains a loading table (LOAD_TABLE) near the beginning of the GENERIC TASK IMAGE code that contains information about its network related component modules GTSKCP.EXE, SCH.EXE, LAD_MASK.EXE, LAST.EXE, LAD.EXE, and DLLDEPCA.EXE, discussed above. The data structure used to keep track of the information of each module is TSK_STRUC which has the following fields:

| TSK_STRUC | STRUC | |
|---|---|---|
| SCRATCH_WORD | DW | 0 |
| MODULE_EXE_SEG | DW | 0 |
| MODULE_CODE_SEG | DW | 0 |
| MODULE_CODE_LEN | DW | 0 |
| MODULE_RESRVED | DW | 5 DUP(0) |
| TSK_STRUC | ENDS | | where SCRATCH_WORD contains the address of a scratch area, MODULE_EXE_SEG contains the address of the module's .EXE header segment, MODULE_CODE_SEG contains the address of the module's code segment, MODULE_CODE_LEN contains a value indicating the length of the code segment, and MODULE_RESERVED is a five-word field reserved for future usage.

For the jumper remote boot procedure, where the GENERIC TASK IMAGE has been relocated, the values in the TSK_STRUC may no longer be valid. Therefore, the MODULE_EXE_SEG and the MODULE_CODE_SEG values for each module are newly initialized to reflect the actual location of each module.

Figure 17:
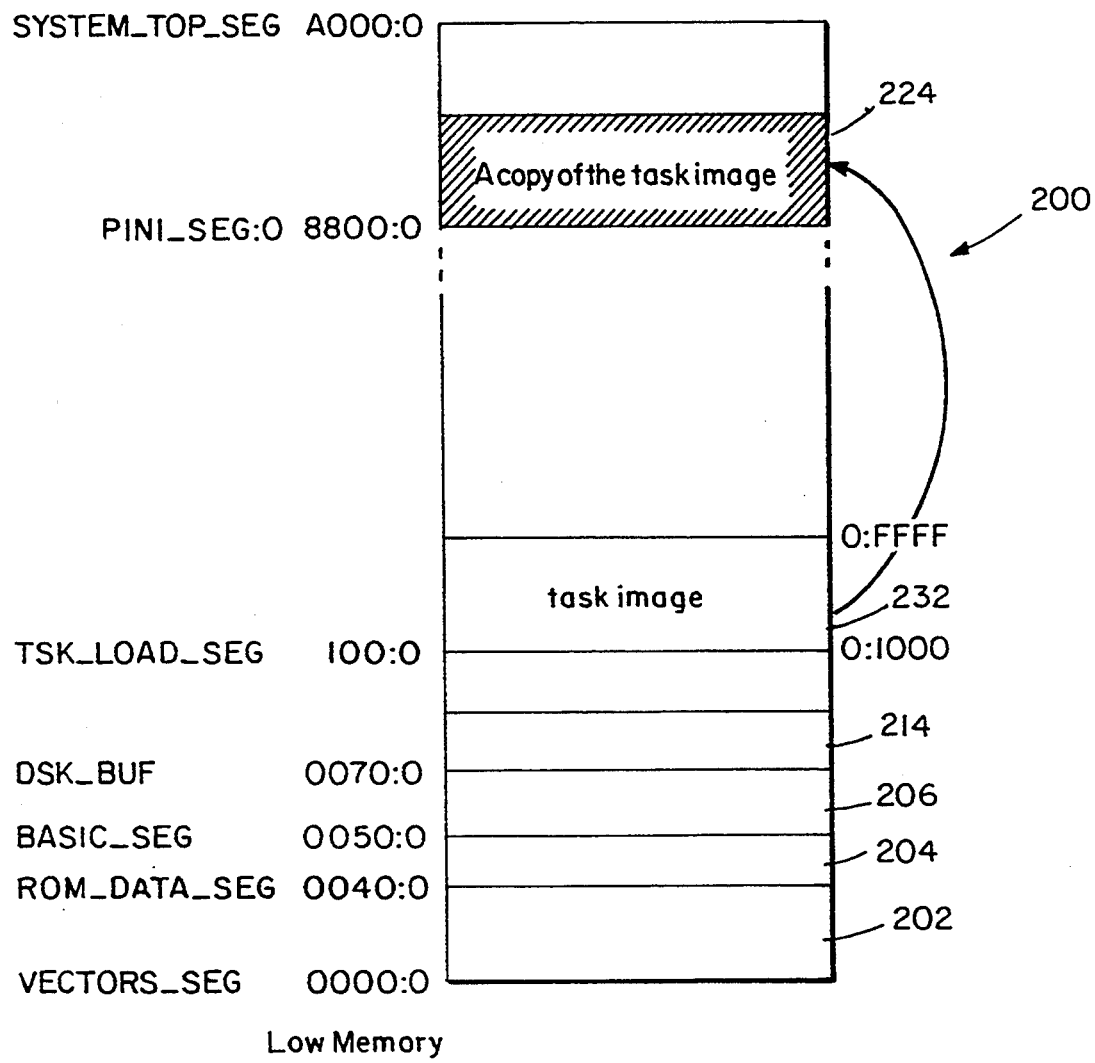
Figure 18:
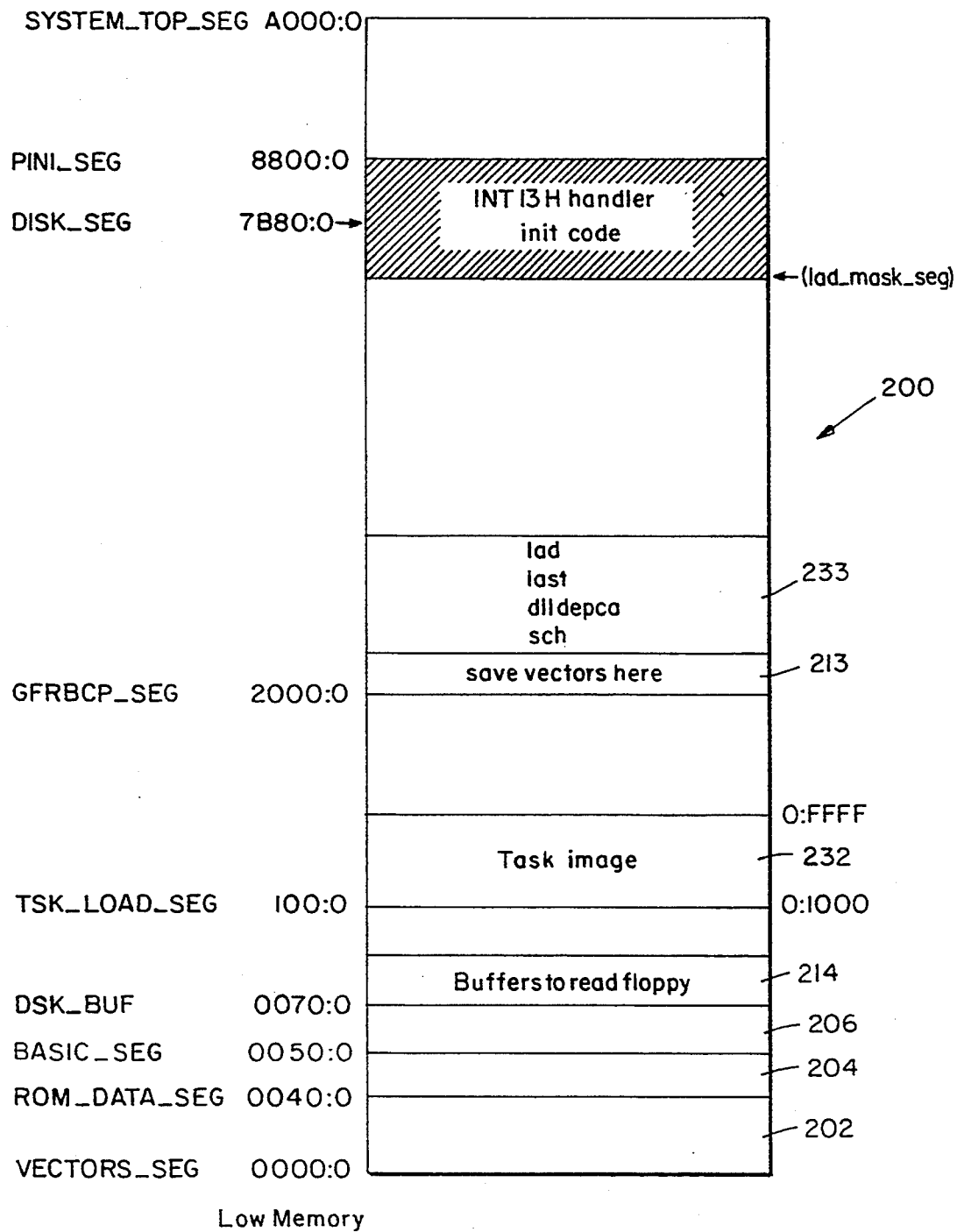

Referring to FIG. 17, GENERIC TASK IMAGE saves the machine state including all the interrupt vectors from 0000:0000 to 0000:00FF of the VECTORS_SEG memory segment 202 into a vector portion 213 of GFRBCP_SEG (2000:0000), and saves the 8259 PIC states.

Unlike the floppy remote boot process, interrupt vector INT 21H has not been affected at this point. Therefore, GENERIC TASK IMAGE sets 75 the DOS interrupt vector INT 21H to point to the MS-DOS service emulation routine in the GTSKCP.BIN control program portion of the GENERIC TASK IMAGE (FIG. 3).

The GENERIC TASK IMAGE next TSR loads 74 modules SCH. EXE, DLLDEPCA. EXE, LAST.EXE, and LAD.EXE in the free memory segment 233 starting immediately above the saved vector area 213. GENERIC TASK IMAGE checks to see if the total TSR size for the SCH.EXE, DLLDEPCA.EXE, LAST.EXE, and LAD.EXE modules crosses into the DISK_SEG memory segment 236 (7B80:0000). If it does, an error message is generated and the jumper remote boot operation is terminated.

The remainder of the jumper remote boot procedure is identical to that of the floppy remote boot procedure described above, starting with the determination of the optimum location to TSR load the LAD_MASK.EXE LAD disk image handler.

While this invention has been particularly shown and described with reference to preferred embodiments thereof, it will be understood by those skilled in the art that various changes in form and details may be made therein without departing from the spirit and scope of the invention as defined by the appended claims. For instance, the local disk image may be stored in memory or another storage device other than XMS, e.g., stored to a local floppy or hard disk. Further, the entire disk image need not be copied to the local system if copying only a few specific modules would suffice to boot the local system. Still further, one skilled in the art will understand that the invention described herein is applicable to networked workstations and network adapters in general, rather than being specific only to IBM-compatible PCs running MS-DOS in a PCSA local area network environment or to NDIS and DEPCA network adapters.

We claim:

1. A method for booting a local data processing system from a remote data processing system over a network, comprising the steps of:

establishing a network communications link between the local data processing system and the remote data processing systme in resposne to powering-up the local data processing system;

issuing a request from the local to the remote data processing system over the network communications link for a task image code module for providing a network interface between the local data processing system and a remote disk on the remote data processing system;

downloading the task image code module form the remote to the local data processing system in response to the request for the task image code module;

invoking the task image code module by the local data processing system to establish a network interface between the local data processing system and the remote disk storing bootable code on the remote data processing system;

copying an image of the bootable code over the network to the local data processing system to create a local bootable code image stored in the local data processing system, the bootable code including an operating system; and inactivating communications over the network;

booting the local data processing system from the local bootable code image stored in the local data processing system and loading the operating system while not protecting a memory space containing the task image code module to thereby leave the memory space available to the operating system.

2. The method of claim 1 wherein the copying step includes copying an image of the remote disk over the network to the local data processing system to create a local disk image stored in the local data processing system, and the booting step includes booting the local data processing system from the local disk image.

3. The method of claim 2 further comprising booting the local data processing system from a local disk to load initialization modules into the local data processing system for establishing the network communications link between the local and the remote data processing systems.

4. The method of claim 3 wherein the local disk comprises a floppy disk.

5. The method of claim 3 wherein the initialization modules comprise:

an operating system emulation module for providing operating system functions for the local data processing system; and network environment modules for providing network communication functions for the local data processing system.

6. The method of claim 5 wherein the operating system emulation module emulates MS-DOS functions.

7. The method of claim 6 wherein the network environment modules provide an Network Driver Interface System (NDIS) network environment for the local data processing system.

8. The method of claim 6 wherein the network environment modules comprise a network adapter driver module for interfacing a software data link layer to a network adapter coupling the local data processing system to the network communications link;

a data link module for implementing the data link layer to interface the local data processing system software to the network adapter;

a protocol manager module for managing the network environment;

a network configuration module including information for configuring the network environment; and a system configuration module for configuring the local data processing system.

9. The method of claim 8 wherein the network environment is Network Driver Interface System (NDIS) and the network adapter driver is an NDIS Media Access Control (MAC) driver, the data link module is an NDIS data link layer module, and the protocol manager module is an NDIS protocol manager module.

10. The method of claim 2 wherein the task image code module comprises an operating system emulation module for providing operating system functions for the local data processing system;

a scheduler module for providing real-time scheduling of network resources for applications running on the local data processing system;

a disk access module for providing disk access services to applications running on the local data processing system for accessing the remote disk; and a disk image access module for providing disk access services to the local data processing system for accessing the disk image stored on the local data processing system.

11. The method of claim 10 further comprising the steps of loading the disk access module into memory of the local data processing system to provide access services to the local data processing system for accessing the remote disk;

using the disk access module to access the remote disk during the step of copying an image of the remote disk to the local data processing system to create a local disk image;

loading the disk image access module into the memory of the local data processing system after the remote disk has been copied to the local disk image to provide access services to the local data processing system for accessing the local disk image; and using the disk image access module to access the local disk image during the step of booting the local data processing system from the local disk image.

12. The method of claim 1 further comprising executing an initialization module stored in ROM to initialize the network communication between the local and the remote data processing systems.

13. The method of claim 12 wherein the initialization module provides a Digital Equipment Corporation (DEPCA) network environment for the local data processing system.

14. The method of claim 1 wherein the issuing a request step comprises generating a Maintenance Operations Protocol (MOP) download request for the task image code module; and the downloading of the task image code module step includes downloading the task image code module to the local data processing system using Maintenance Operations Protocol.

15. The method of claim 1 wherein the local data processing system is a Personal Computer having a directly addressed conventional memory and an indirectly addressed extended memory; and the bootable code is copied to the extended memory.

16. The method of claim 1 further comprising the steps of disconnecting the local data processing system from the network after the step of copying the image of the bootable code from the remote storage system to the local data processing system; and the step of booting the data processing system from the local bootable code image further comprises loading an operating system module from the bootable code image into the local data processing system;

invoking the operating system module to control the local data processing system;

loading network environment modules from the bootable code image into the local data processing system under control of the operating system module; and invoking a last-loaded one of the network environment modules to reestablish a network environment for the local data processing system.

17. The method of claim 16, wherein the step of booting the data processing system is performed while the local data processing system is disconnected from the network.

18. The method of claim 1 further comprising:

inactivating the network communications after the step of copying the image of the bootable code; and booting the local data processing system while the network communications are inactive.

19. The method of claim 1 further comprising performing the step of copying the image of the bootable code every time the local data processing system is booted.

20. A method for booting a local data processing system from a remote data processing system over a network, comprising the steps of:

establishing a network communications link between the local data processing system and the remote data processing system in response to powering-up the local data processing system;

issuing a request from the local to the remote data processing system over the network communications link for a task image code module for providing a network interface between the local data processing system and a remote disk on the remote data processing system;

downloading the task image code module from the remote to the local data processing system in response to the request for the task image code module;

invoking the task image code module by the local data processing system to establish a network interface between the local data processing system and the remote disk storing bootable code on the remote data processing system;

copying an image of the remote disk over the network to the local data processing system to create a local disk image stored in the local data processing system;

after finishing the copying of the image of the remote disk, disconnecting the local data processing system from the network;

booting the local data processing system from the local disk image stored in the local data processing system including the steps of loading an operating system module from the disk image into the local data processing system while not protecting a memory space containing the task image code module to thereby leave the memory space available to the operating system;

invoking the operating system module to control the local data processing system;

loading network environment modules from the disk image into the local data processing system under control of the operating system module; and invoking a last-loaded one of the network environment modules to reestablish a client PC network environment.

21. The method of claim 20 wherein the initializing step further comprises booting the local data processing system from a local disk to load initialization modules into the local data processing system for establishing the network communications link between the local and the remote data processing systems.

22. The method of claim 21 wherein the local disk comprises a floppy disk.

23. The method of claim 21 wherein the initialization modules comprise:

an operating system emulation module for providing operating system functions for the local data processing system; and network environment modules for providing network communication functions for the local data processing system.

24. The method of claim 23 wherein the operating system emulation module emulates MS-DOS functions.

25. The method of claim 23 wherein the network environment modules provide an Network Driver Interface System (NDIS) network environment for the local data processing system.

26. The method of claim 23 wherein the network environment modules comprise a network adapter driver module for interfacing a software data link layer to a network adapter coupling the local data processing system to the network communications link;

a data link module for implementing the data link layer to interface the local data processing system software to the network adapter;

a protocol manager module for managing the network environment;

a network configuration module including information for configuring the network environment; and a system configuration module for configuring the local data processing system.

27. The method of claim 26 wherein the network environment is Network Driver Interface System (NDIS) and the network adapter driver is an NDIS Media Access Control (MAC) driver, the data link module is an NDIS data link layer module, and the protocol manager module is an NDIS protocol manager module.

28. The method of claim 20 wherein the initializing step comprises executing an initialization module stored in ROM to initialize the network communication between the local and the remote data processing systems.

29. The method of claim 28 wherein the initialization module provides a Digital Equipment Corporation (DEPCA) network environment for the local data processing system.

30. The method of claim 20 wherein
the issuing a request step comprises generating a Maintenance Operations Protocol (MOP) download request for the task image code module; and
the downloading of the task image code module step includes downloading the task image code module to the local data processing system using Maintenance Operations Protocol.

31. The method of claim 20 wherein the task image code module comprises
an operating system emulation module for providing operating system functions for the local data processing system;
a scheduler module for providing real-time scheduling of network resources for applications running on the local data processing system;
a disk access module for providing disk access services to applications running on the local data processing system for accessing the remote disk; and
a disk image access module for providing disk access services to the local data processing system for accessing the disk image stored on the local data processing system.

32. The method of claim 31 further comprising the steps of
loading the disk access module into a memory of the local data processing system to provide access services to the local data processing system for accessing the remote disk;
using the disk access module to access the remote disk during the step of copying an image of the remote disk to the local data processing system to create a local disk image;
loading the disk image access module into the memory of the local data processing system after the remote disk has been copied to the local disk image to provide access services to the local data processing system for accessing the local disk image; and
using the disk image access module to access the local disk image during the step of booting the local data processing system from the local disk image.

33. The method of claim 20 wherein
the local data processing system is a Personal Computer having a directly addressed conventional memory and an indirectly addressed extended memory; and
the disk image is copied to the extended memory.

34. The method of claim 20 further comprising performing the step of copying the image of the remote disk every time the local data processing system is booted.

35. A method for booting a client workstation from a remote data processing system over a network, comprising the steps of:
initializing the client workstation sufficiently to establish network communications with a remote disk on the remote data processing system in response to powering up the client workstation and then establishing a network communications link between the client workstation and remote system;
issuing a request from the client workstation to the remote data processing system over the network communications link for a task image code module for providing a network interface between the client workstation and the remote disk on the remote data processing system;
downloading the task image code module from the remote system to the client workstation in response to the request for the task image code module;
invoking the task image code module by the client workstation to establish a network interface between the client workstation and the remote disk;
copying an image of the remote disk over the network to the client workstation to create a local disk image stored in the client workstation;
disconnecting the client workstation from the network;
booting the client workstation from the disk image stored in the client workstation, including
loading an operating system module from the disk image into the client workstation while not protecting a memory space containing the task image code module to thereby leave the memory space available to the operating system;
invoking the operating system module to control the client workstation;
loading network environment modules from the disk image into the client workstation under control of the operating system module; and
invoking a last-loaded one of the network environment modules to reestablish a client workstation network environment.

36. The method of claim 35 wherein the initializing step further comprises booting the client workstation from a local disk to load initialization modules into the client workstation for establishing the network communications link between the client workstation and the remote data processing system.

37. The method of claim 36 wherein the local disk comprises a floppy disk.

38. The method of claim 36 wherein the initialization modules comprise:
an operating system emulation module for providing operating system functions for the client workstation; and
network environment modules for providing network communication functions for the client workstation.

39. The method of claim 38 wherein the operating system emulation module emulates MS-DOS functions.

40. The method of claim 38 wherein the network environment modules provide an Network Driver Interface System (NDIS) network environment for the client workstation.

41. The method of claim 38 wherein the network environment modules comprise
a network adapter driver module for interfacing a software data link layer to a network adapter coupling the client workstation to the network communications link;
a data link module for implementing the data link layer to interface the client workstation software to the network adapter;
a protocol manager module for managing the network environment;

a network configuration module including information for configuring the network environment; and a system configuration module for configuring the client workstation.

42. The method of claim 41 wherein the network environment is Network Driver Interface System (NDIS) and the network adapter driver is an NDIS Media Access Control (MAC) driver, the data link module is an NDIS data link layer module, and the protocol manager module is an NDIS protocol manager module.

43. The method of claim 35 wherein the initializing step comprises executing an initialization module stored in ROM to initialize the network communication between the client workstation and the remote data processing system.

44. The method of claim 43 wherein the initialization module provides a Digital Equipment Corp. Oration (DEPCA) network environment for the client workstation.

45. The method of claim 35 wherein the issuing a request step comprises generating a Maintenance Operations Protocol (MOP) download request for the task image code module; and the downloading of the task image code module step includes downloading the task image code module to the client workstation using Maintenance Operations Protocol.

46. The method of claim 35 wherein the task image code module comprises an operating system emulation module for providing operating system functions for the client workstation;

a scheduler module for providing real-time scheduling of network resources for applications running on the client workstation;

a disk access module for providing disk access services to applications running on the client workstation for accessing the remote disk; and a disk image access module for providing disk access services to applications running on the client workstation for accessing the disk image stored in the client workstation.

47. The method of claim 35 further comprising the steps of loading the disk access module into the memory of the client workstation to provide access services to the client workstation for accessing the remote disk;

using the disk access module to access the remote disk during the step of copying an image of the remote disk to the client workstation to create a local disk image;

loading the disk image access module into the memory of the client workstation after the remote disk has been copied to the local disk image to provide access services to the client workstation for accessing the local disk image; and using the disk image access module to access the local disk image during the step of booting the client workstation from the local disk image.

48. The method of claim 35 wherein the disk image is stored in extended memory of the client workstation.

49. The method of claim 35, further comprising performing the step of booting the client workstation while the client workstation is disconnected from the network.

50. The method of claim 35 further comprising performing the step of copying the image of the remote disk every time the local data processing system is booted.

51. A data processing system having a local data processing system booted from a remote data processing system over a network, comprising networking means for establishing a network communications link between the local data processing system and the remote data processing system;

request means for issuing a request from the local data processing system to the remote data processing system over the network communications link for a task image code module for providing a network interface between the local data processing system and a remote disk storing bootable code on the remote data processing system;

downloading means for downloading the task image code module from the remote to the local data processing system in response to the request for the task image code module;

invoking means for invoking the task image code module by the local data processing system to establish a network interface between the local data processing system and the remote disk;

copying means for copying an image of the bootable code over the network to the local data processing system to create a local bootable code image stored in the local data processing system, the bootable code including an operating system; and booting means for booting the local data processing system from the local bootable code image after it has been completely stored in the local data processing system while the network communications link is inactivated, the booting means loading the operating system while not protecting a memory space containing the task image code module to thereby leave the memory space available to the operating system.

52. The data processing system of claim 51 wherein the copying means includes disk copying means for copying an image of the remote disk over the network to the local data processing system to create a local disk image stored in the local data processing system, and the booting means includes disk image booting means for booting the local data processing system from the local disk image.

53. The data processing system of claim 52 wherein the initialization modules comprise:

an operating system emulation module for providing operating system functions for the local data processing system; and network environment modules for providing network communication functions for the local data processing system.

54. The data processing system of claim 53 wherein the operating system emulation module emulates MS-DOS functions.

55. The data processing system of claim 53 wherein the network environment modules provide an Network Driver Interface System (NDIS) network environment for the local data processing system.

56. The data processing system of claim 53 wherein the network environment modules comprise a network adapter driver module for interfacing a software data link layer to a network adapter coupling the local data processing system to the network communications link;

a data link module for implementing the data link layer to interface the local data processing system software to the network adapter;

a protocol manager module for managing the network environment;

a network configuration module including information for configuring the network environment; and a system configuration module for configuring the local data processing system.

57. The data processing system of claim 56 wherein the network environment is Network Driver Interface System (NDIS) and the network adapter driver is an NDIS Media Access Control (MAC) driver, the data link module is an NDIS data link layer module, and the protocol manager module is an NDIS protocol manager module.

58. The data processing system of claim 52 wherein the task image code module comprises an operating system emulation module for providing operating system functions for the local data processing system;

a scheduler module for providing real-time scheduling of network resources for applications running on the local data processing system;

a disk access module for providing disk access services to applications running on the local data processing system for accessing the remote disk; and a disk image access module for providing disk access services to the local data processing system for accessing the disk image stored on the local data processing system.

59. The data processing system of claim 58 further comprising means for loading the disk access module into a memory of the local data processing system to provide access services to the local data processing system for accessing the remote disk;

means for using the disk access module to access the remote disk during the step of copying an image of the remote disk to the local data processing system to create a local disk image;

means for loading the disk image access module into the memory of the local data processing system after the remote disk has been copied to the local disk image to provide access services to the local data processing system for accessing the local disk image; and means for using the disk image access module to access the local disk image during the step of booting the local data processing system from the local disk image.

60. The data processing system of claim 51 further comprising local boot means for booting the local data processing system from a local disk to load initialization modules into the local data processing system for establishing the network communications link between the local and the remote data processing systems.

61. The data processing system of claim 60 wherein the local disk comprises a floppy disk.

62. The data processing system of claim 51 further comprising an initialization module stored in ROM to initialize the network communication between the local and the remote data processing systems.

63. The data processing system of claim 62 wherein the initialization module provides a Digital Equipment Corporation (DEPCA) network environment for the local data processing system.

64. The data processing system of claim 51 wherein the request means includes means for generating a Maintenance Operations Protocol (MOP) download request for the task image code module; and the downloading means includes means for downloading the task image code module to the local data processing system using Maintenance Operations Protocol.

65. The data processing system of claim 51 wherein the local data processing system is a Personal Computer having a directly addressed conventional memory and an indirectly addressed extended memory; and the bootable code is copied to the extended memory.

66. The data processing system of claim 51 further comprising disconnect means for disconnecting the local data processing system from the network after the image of the bootable code is copied from the remote storage system to the local data processing system; and the booting means comprises operating system loading means for loading an operating system module from the bootable code image into the local data processing system;

operating system invoking means for invoking the operating system module to control the local data processing system;

network loading means for loading network environment modules from the bootable code image into the local data processing system under control of the operating system module; and environment invoking means for invoking a last-loaded one of the network environment modules to reestablish a network environment for the local data processing system.

67. The data processing system of claim 66, wherein the booting means boots the local data processing system while the local data processing system is disconnected from the network.

68. The data processing system of claim 51 wherein the copying means copies the image of the bootable code every time the data processing system is booted.

69. A workstation for connection to a network comprising networking means for establishing a network communications link between a local data processing system and remote data processing system;

request means for issuing a request from the local data processing system to the remote data processing system over the network communications link for a task image code module for providing a network interface between the local data processing system and a remote disk storing bootable code on the remote data processing system;

downloading means for downloading the task image code module from the remote to the local data processing system in response to the request for the task image code module;

invoking means for invoking the task image code module by the local data processing system to establish a network interface between the local data processing system and the remote disk;

copying means for copying an image of the bootable code over the network to the workstation to create a local bootable code image stored in the workstation, the bootable code including an operating system; and booting means for booting the workstation from the local bootable code image only after the bootable code including the operating system has been stored in the workstation and while the network link is inactivated, the booting means loading the operating system while not protecting a memory space containing the task image code module to thereby leave the memory space available to the operating system.

* * * * *